United States Patent
Matsumura et al.

(10) Patent No.: US 9,208,425 B2
(45) Date of Patent: Dec. 8, 2015

(54) RFID TAG

(71) Applicant: FUJITSU LIMITED, Kawasaki-shi, Kanagawa (JP)

(72) Inventors: Takayoshi Matsumura, Yokohama (JP); Kenzo Nishide, Kawasaki (JP); Shigeru Gotou, Kawasaki (JP); Noritsugu Ozaki, Yokohama (JP); Shunji Baba, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/460,414

(22) Filed: Aug. 15, 2014

(65) Prior Publication Data

US 2015/0060554 A1    Mar. 5, 2015

(30) Foreign Application Priority Data

Aug. 28, 2013 (JP) ................ 2013-176879

(51) Int. Cl.
*G06K 19/06* (2006.01)
*G06K 19/077* (2006.01)

(52) U.S. Cl.
CPC ...... *G06K 19/07728* (2013.01); *G06K 19/0776* (2013.01); *G06K 19/07722* (2013.01); *G06K 19/07749* (2013.01)

(58) Field of Classification Search
CPC ............... G06K 19/077; G06K 19/07728
USPC .................... 235/492; 340/572.1–572.9
See application file for complete search history.

(56) References Cited

U.S. PATENT DOCUMENTS 5,321,240 A * 6/1994 Takahira ............... 235/380
2010/0078487 A1 4/2010 Baba et al.

FOREIGN PATENT DOCUMENTS

JP    2010-086361    4/2010

* cited by examiner

*Primary Examiner* — Jamara Franklin
(74) *Attorney, Agent, or Firm* — Fujitsu Patent Center

(57) ABSTRACT

An RFID tag including an inlay having a sheet-like shape and including an antenna and an IC chip electrically connected to the antenna, an outer covering member that covers the inlay, the outer covering member having a planar shape and including a main surface and a rear surface, and a frame part arranged on at least one of the main surface and the rear surface. The frame part is erected in a thickness direction of the outer covering member. The frame part surrounds the IC chip in a plan view.

17 Claims, 24 Drawing Sheets

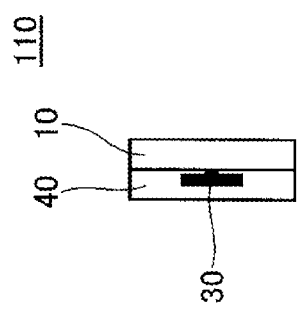
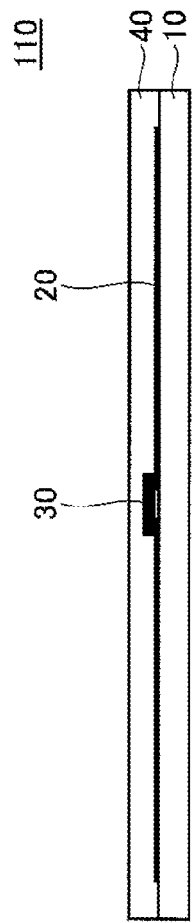
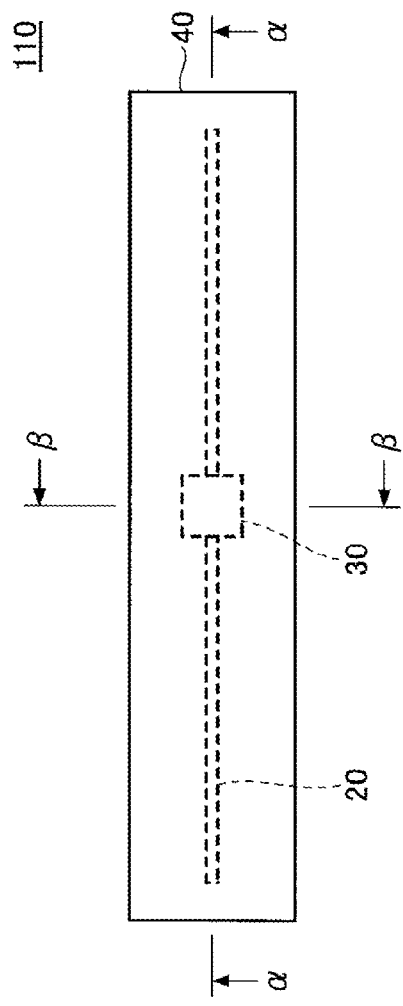

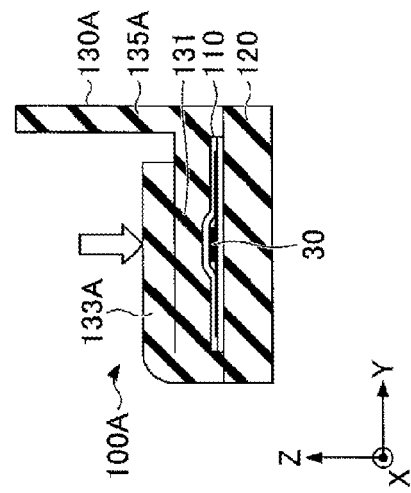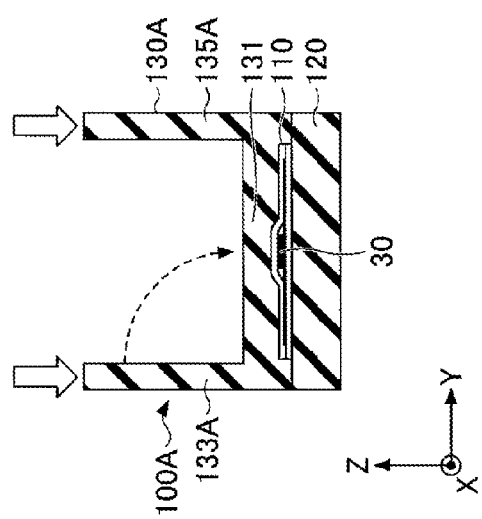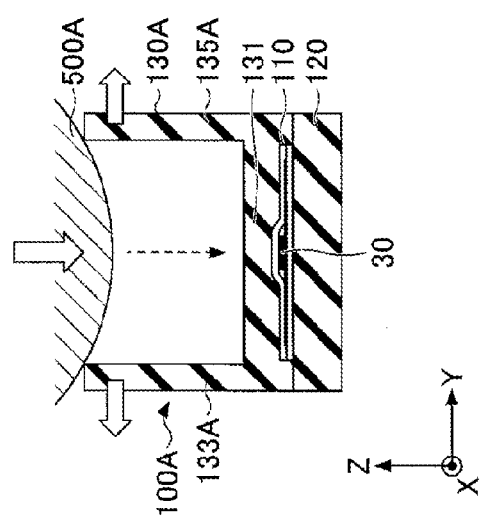

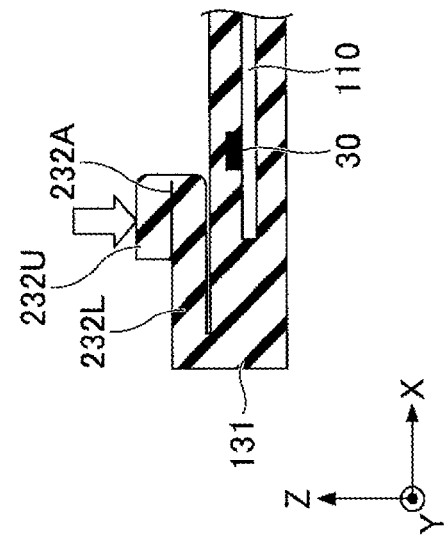
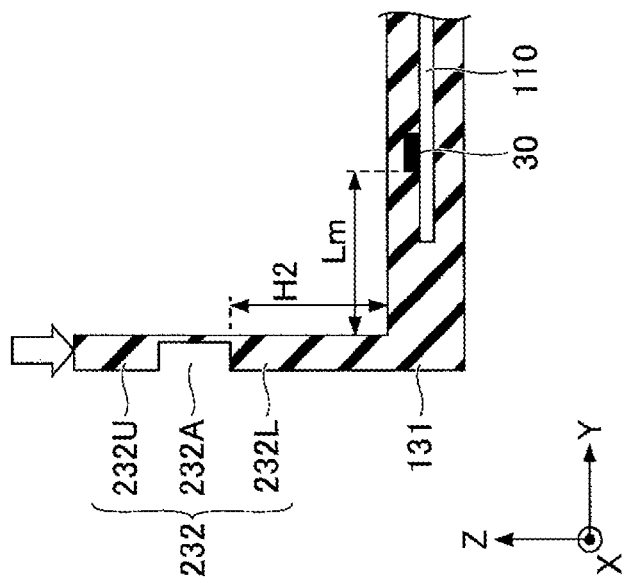

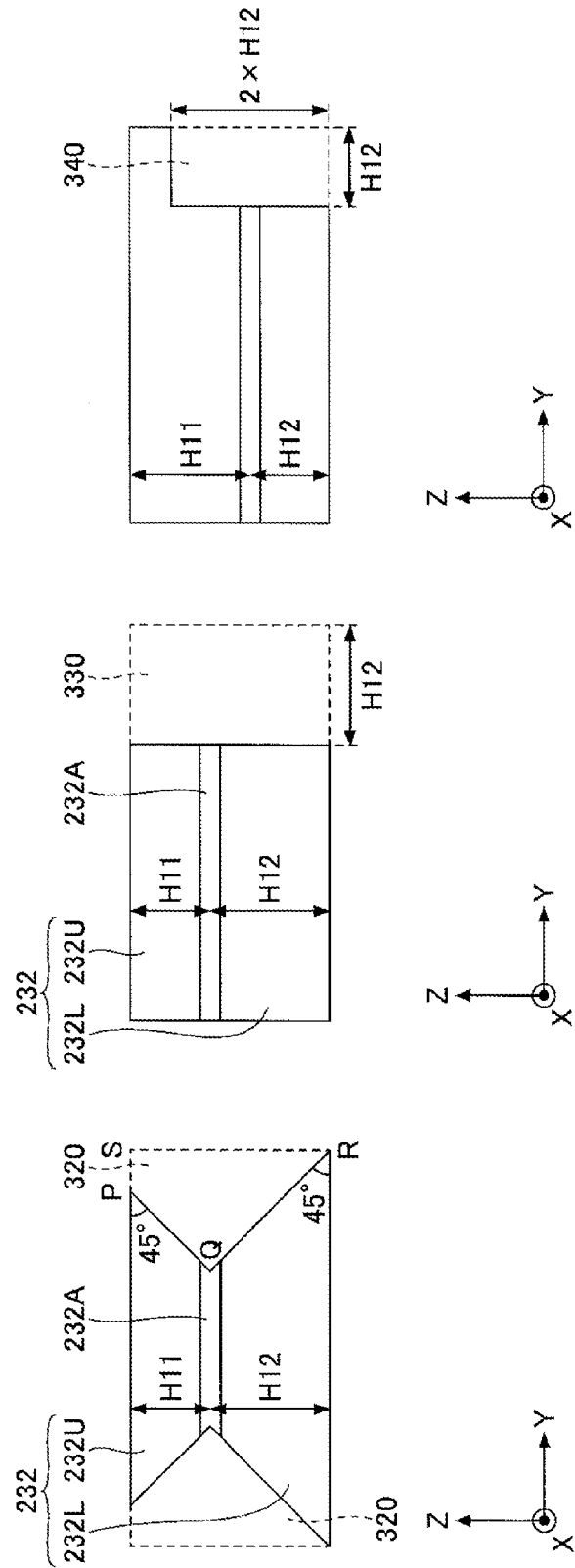

RFID TAG

CROSS-REFERENCE TO RELATED APPLICATIONS

This application is based upon and claims the benefit of priority of the prior Japanese Patent Application No. 2013-176879 filed on Aug. 28, 2013, the entire contents of which are incorporated herein by reference.

FIELD

The embodiments discussed herein are related to an RFID (Radio Frequency Identification) tag.

BACKGROUND

Conventionally, there is an RFID tag having a circuit chip that communicates with an external device by way of non-contact communication. The RFID tag includes a conductive pattern that is connected to the circuit chip and functions as an antenna. The RFID tag also includes a unit base substrate on which the circuit chip is mounted.

Further, the RFID tag includes an upper layer sheet member having an area larger than the unit base substrate. The upper layer sheet member includes a first sheet member fixed to one surface of the unit base substrate, and second and third sheet members that have an elastic property. A reinforcement member is provided between the second and third sheet members for reinforcing the circuit chip. The upper layer sheet member have the reinforcement member and the circuit chip arranged in a state in which the reinforcement member and the circuit chip are superposed from a plan view of the upper layer sheet member. The second sheet member is fixed onto the first sheet member, so that the entire unit base substrate is encapsulated between the first and second sheet members (see, for example, Japanese Laid-Open Patent Publication No. 2010-086361).

The conventional RFID tag is manufactured without expecting a case where a relatively large amount of stress or weight is exerted to the RFID tag. Therefore, the RFID tag is liable to breakage when such stress or weight is exerted to the RFID tag.

SUMMARY

According to an aspect of the invention, there is provided an RFID tag including an inlay having a sheet-like shape and including an antenna and an IC chip electrically connected to the antenna, an outer covering member that covers the inlay, the outer covering member having a planar shape and including a main surface and a rear surface, and a frame part arranged on at least one of the main surface and the rear surface, wherein the frame part is erected in a thickness direction of the outer covering member, wherein the frame part surrounds the IC chip in a plan view.

The object and advantages of the invention will be realized and attained by means of the elements and combinations particularly pointed out in the claims.

It is to be understood that both the foregoing generation description and the followed detailed description are exemplary and explanatory and are not restrictive of the invention, as claimed.

BRIEF DESCRIPTION OF DRAWINGS

FIGS. 2A-2C are schematic diagrams illustrating an inlay according to an embodiment of the present invention;

FIGS. 6A-6C are schematic diagrams illustrating a state where stress is exerted to an RFID tag of a comparative example;

FIGS. 18A-18B are schematic diagrams illustrating a relationship between a height of a groove part and a distance between an inner surface of a sidewall part and an IC chip according to an embodiment of the present invention;

FIGS. 22A-22C are schematic diagrams illustrating a notch part for fabricating a slit that prevents overlapping of a cover part in a folded state according to an embodiment of the present invention;

DESCRIPTION OF EMBODIMENTS

An RFID tag according to embodiment(s) of the present invention is described below.

First Embodiment

Figure 1A:
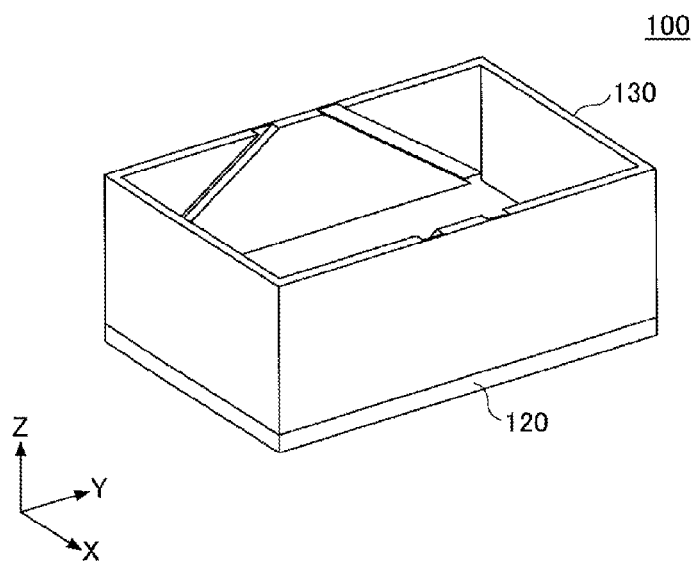
FIGS. 1A-1B are schematic diagrams illustrating an RFID tag according to a first embodiment of the present invention.
Figure 1B:
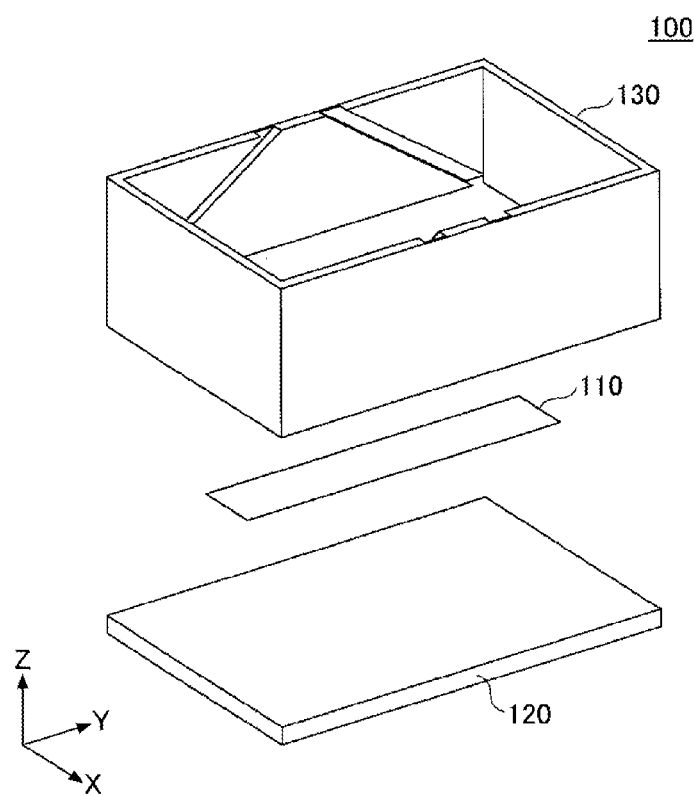

FIGS. 1A and 1B illustrate an RFID tag 100 according to the first embodiment. FIG. 1A is a perspective view of the RFID tag 100. FIG. 1B is an exploded view of the RFID tag 100. FIGS. 2A-2C illustrate an inlay 110 of the RFID tag 100. In the following, an X-Y-Z coordinate system is defined as illustrated in the accompanying drawings.

The RFID tag 100 includes the inlay 110 and cover parts 120, 130.

As illustrated in FIG. 1B, the inlay 110 is sandwiched between the cover parts 120, 130. The inlay 110 cannot be seen from the outside in a state where the RFID tag 100 is in an assembled state as illustrated in FIG. 1A. The inlay 110 is a sheet-like material that covers an IC (Integrated Chip) and an antenna. A configuration of the inlay 110 is described below with reference to FIGS. 2A-2C.

The cover part 120 is an example of an outer covering member that covers one surface (lower surface in FIG. 1B) of the inlay 110. The cover part 120 is formed of, for example, a rubber material having a flexible and elastic property. The cover part 120 is provided for protecting the inlay 110.

The cover part 130 is an example of an outer covering member that covers another surface (upper surface in FIG. 1B) of the inlay 110. The cover part 130 is also an example of a frame part. The cover part 130 is formed of, for example, a rubber material having a flexible and elastic property. The cover part 130 is provided for protecting the inlay 110. The cover part 130 is described in further detail below with reference to FIGS. 3A to 5B.

Next, the inlay 110 of the RFID tag 100 according to an embodiment of the present invention is described.

FIGS. 2A-2C are schematic diagrams illustrating the inlay 110. FIG. 2A illustrates a cross section of the inlay 110 with respect to a longitudinal direction of the inlay 110. FIG. 2B is a plan view of the inlay 110. FIG. 2C illustrates a cross section of the inlay 110 with respect to a transverse direction of the inlay 110. FIG. 2A is a cross-sectional view taken along line α-α of FIG. 2B. FIG. 2C is a cross-sectional view taken along line β-β of FIG. 2B.

As illustrated in FIGS. 2A-2C, the inlay 110 includes a sheet part 10, an antenna 20, an IC chip 30, and a sheet part 40.

The sheet part 10, which is a sheet-like material, is an example of a first sheet part. Before the sheet part 10 is adhered to the sheet part 40, the antenna 20 and the IC chip 30 are mounted on one surface of the sheet part 10.

The sheet part 10 may be formed of, for example, a material having a flexible property, a rubber type material having both flexible and elastic properties, or an elastomer type material having an elastic property.

For example, a polyimide film or a PET (polyethylene terephthalate) film may be used as the material having a flexible property.

For example, a silicone (silica ketone) rubber, a butyl rubber, a nitrile rubber, a hydrogenated nitrile rubber, a fluoro rubber, an epichlorohydrin rubber, an isoprene rubber, a chlorosulfonated polyethylene rubber, or a urethane rubber may be used as the rubber type material.

For example, a vinyl chloride type, a styrene type, a olefin type, an ester type, a urethane type, or an amide type elastomer may be used as the elastomer type material.

It is, however, to be noted that the material of the sheet part 10 is not limited to those described above. Other materials may be used to form the sheet part 10.

The antenna 20 is formed on one surface of the sheet part 10 before the sheet part 10 and the sheet part 40 are adhered to each other. The antenna 20 is formed of, for example, a silver paste, a copper foil, or an aluminum foil. The antenna 20 is connected to a pair of terminals of the IC chip 30.

When the IC chip 30 receives an RF (Radio Frequency) band signal for reading from a reader/writer of the RFID tag 100 via the antenna 20, the IC chip 30 is activated by the voltage of the received signal. Thereby, the IC chip 30 transmits identification data via the antenna 20. Accordingly, identification data of the RDID tag can be read with a reader/writer.

The sheet part 40, which is formed with the same material as the sheet part 10, is an example of a second sheet part. The size of the sheet part 40 from the plan view is the same as the size of the sheet part 10 from the plan view. Further, the sheet part 40 and the sheet part 10 have the same thickness. The same sheet-like material may be used to form both the sheet part 10 and the sheet part 40 as a united body.

The sheet part 40 is adhered to the corresponding sheet part 10. Thereby, the antenna 20 and the IC chip 30 are covered in-between the sheet part 40 and the sheet part 10.

Figure 3A:
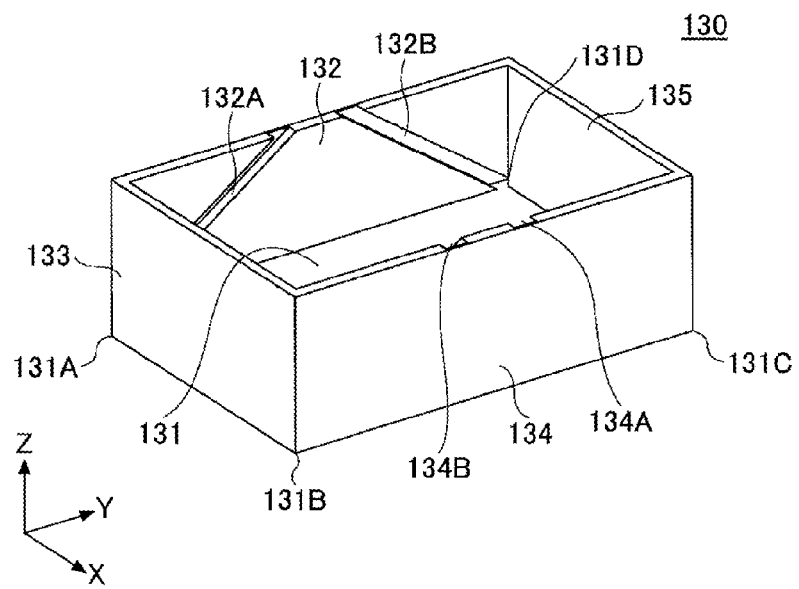
FIGS. 3A-3B are schematic diagrams illustrating a cover part according to an embodiment of the present invention.
Figure 3B:
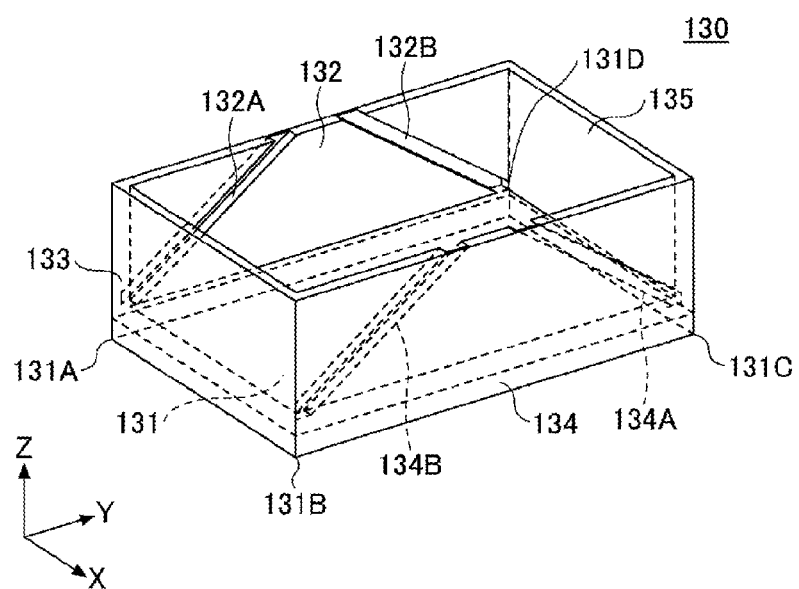
Figure 4A:
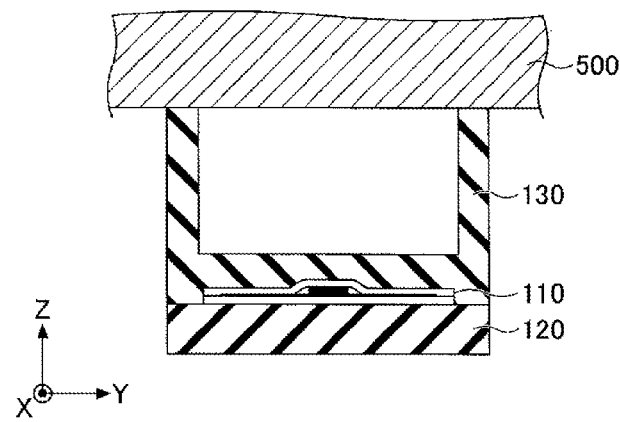
FIGS. 4A-4C are schematic diagrams illustrating a cover part according to an embodiment of the present invention.
Figure 4B:
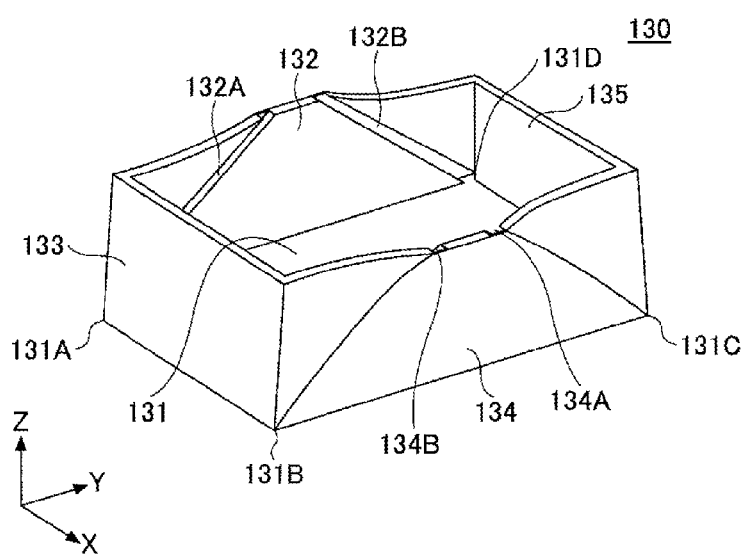
Figure 4C:
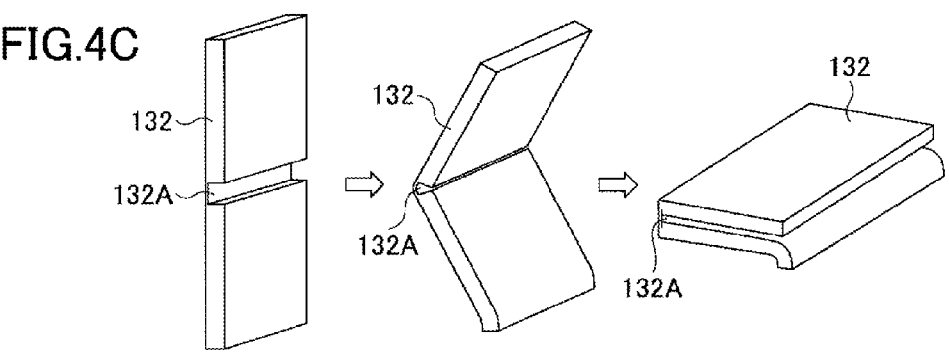

Next, the cover part 130 of the RFID tag 100 according to a first embodiment is described with reference to FIG. 3A to FIG. 5B. FIG. 3A is a perspective view illustrating the cover part 130. FIG. 3B is a transparent view of the cover part 130 corresponding to FIG. 3A. FIG. 4A is a cross-sectional view of the cover part 130 of the RFID tag 100 in a state where a heavy object 500 is contacting the cover part 130. FIG. 4B is a schematic view illustrating the cover part 130 in a state where pressure is beginning to be exerted to the cover part 130. FIG. 4C is a schematic diagram illustrating the folding of a sidewall part 132 of the cover part 130. The object 500 may be, for example, a heavy object made of a metal material. However, an object of other materials may be used as long as the object is heavy enough to substantially compress the cover part 130.

Figure 5A:
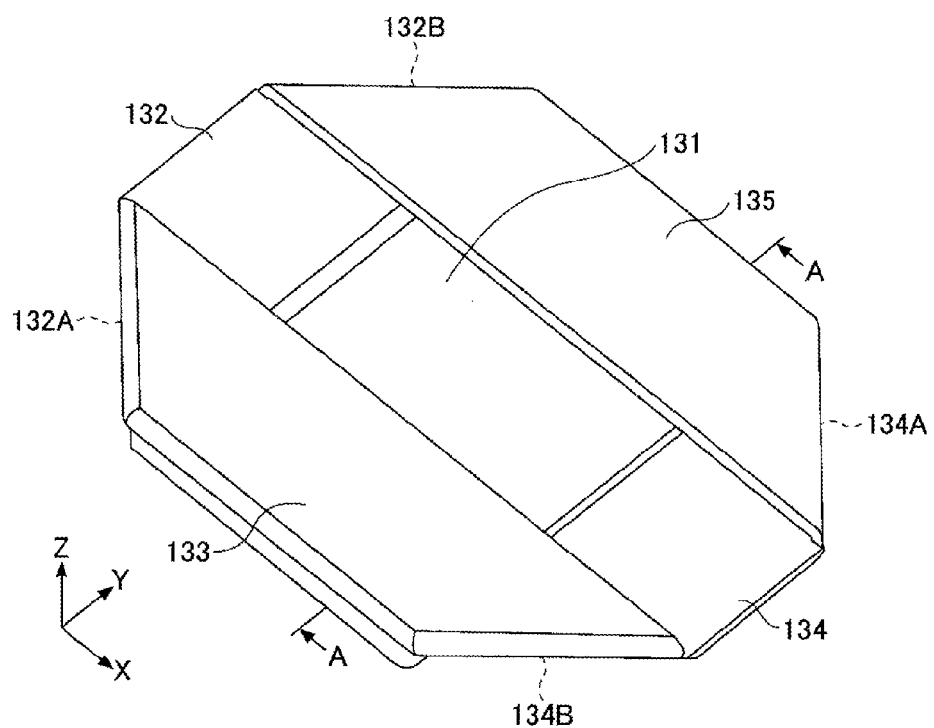
FIGS. 5A-5B are schematic diagrams illustrating a cover part according to an embodiment of the present invention.
Figure 5B:
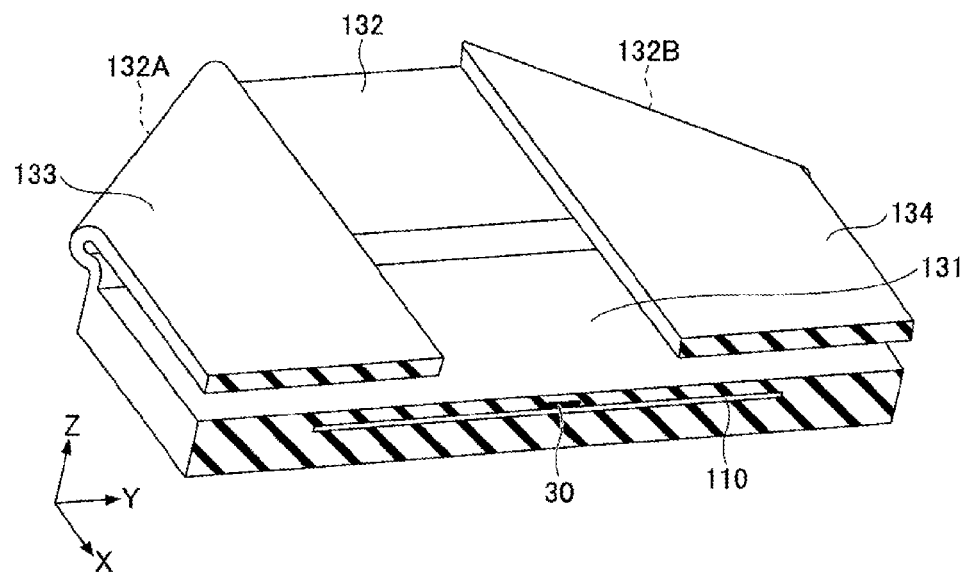

FIG. 5A is a schematic diagram illustrating the cover part 130 of the RFID tag 100 in a folded state. FIG. 5B is a cross-sectional view of the cover part 130 taken along line A-A of FIG. 5A.

As illustrated in FIGS. 3A and 3B, the cover part 130 includes a bottom part 131, and sidewall parts 132, 133, 134, and 135.

In a case where stress is exerted to the RFID tag 100 in a direction parallel to an XY plane or a direction substantially parallel to the XY plane, the stress is received in the plane directions of the cover part 120 and the bottom parts 131. Therefore, the RFID tag 100 is resistant with respect to the stress in the direction parallel to the XY plane or the direction substantially parallel to the XY plane. However, a countermeasure is to be taken with respect to the stress in the Z axis direction because the cover part 120 and the bottom part 131 are relatively thin in the Z axis direction.

As one countermeasure, the cover part 130 of the RFID tag 100 is provided with the sidewall parts 132-135 that are erect from the bottom part 131.

The bottom part 131 is a thin plate member having a plan-view shape of a rectangle. The plan view shape of the bottom part 131 is substantially equal to the size of the cover part 120 (see FIG. 1B). The bottom part 131 is an example of the outer covering member. Four sides of the bottom part 131 are connected to the four corresponding sidewall parts 132-135. For example, the bottom part 131 may be integrally formed with the sidewall parts 132-135.

The bottom part 313 includes four vertices 131A, 131B, 131C, and 131D. Among the four vertices 131A-131D, the vertex 131A is positioned closest toward a negative side in the X axis direction and closest toward a negative side in the Y axis direction. The vertices 131A-131D are arranged in a counter-clockwise direction from a plan view of the bottom part 313.

Because the bottom part 131 and the cover part 120 are both examples of the outer covering member, the bottom part 131 and the cover part 120 may be assumed to constitute a single outer covering member. In a case where the bottom part 131 and the cover part 120 constitute a single outer covering member, an upper surface of the bottom part 131 may be handled as the main surface of the outer covering member, and a lower surface of the cover part 120 may be handled as a rear surface of the outer covering member.

The sidewall parts 132-135 are erected as a frame from the four sides of the bottom part 131. Thereby, the sidewall parts 132-135 constitute a frame. The sidewall parts 132-135 are examples of frame parts. For example, the sidewall parts 132-135 may be integrally formed with the bottom part 131. The sidewall parts 132-135 and the bottom part 131 form a hollow rectangular parallelepiped shape without having an upper surface.

The sidewall part 132 and the sidewall part 134 face each other and have substantially the same dimensions. Further, the sidewall part 133 and the sidewall part 135 face other and have substantially the same dimensions.

Although the sidewall parts 132-135 have the same height (length in the Z axis direction), the lengths of the sidewall parts 132, 134 in their longitudinal directions (length in the Y axis direction) are greater than the lengths of the sidewall parts 133, 135 in their longitudinal directions (length in the X axis direction).

It is to be noted that the lengths of the sidewall parts 132, 134 in their longitudinal directions may be the same as the lengths of the sidewall parts 133, 135 in their longitudinal directions. Alternatively, the lengths of the sidewall parts 133, 135 in their longitudinal directions may be less than the lengths of the sidewall parts 132, 134 in their longitudinal directions.

A groove part 132A and a groove part 132B are formed in an inner surface of the sidewall part 132 and an inner surface of the sidewall part 134, respectively. The inner surface of the sidewall part 132 is a surface of the sidewall part 132 positioned toward the positive side in the X axis direction. That is, the inner surface of the sidewall part 132 is a surface provided on an inner side of the cover part 130. Similarly, the inner surface of the sidewall part 134 is a surface of the sidewall part 134 positioned toward the negative side in the X axis direction. That is, the inner surface of the sidewall part 134 is also a surface provided on an inner side of the cover part 130.

The groove part 132A extends from the vertex 131A of the bottom part 131 toward the positive side in the Y axis direction and the positive side in the Z axis direction. The groove part 132A is formed extending to a point where an upper end of the groove part 132A reaches an upper side of the sidewall part 132. The upper end of the groove part 132A is positioned more toward the negative side in the Y axis direction than a midpoint of the sidewall part 132 in the Y axis direction.

The groove part 132B is axially symmetric to the groove part 132A from a Y-Z plane view. The axis of symmetry between the groove part 132A and the groove part 132B is parallel to the Z axis and runs through a midpoint of the Y-direction length of the sidewall part 132. The groove part 132B extends from the vertex 131D of the bottom part 131 toward the negative side in the Y axis direction and the positive side in the Z axis direction. The groove part 132B is formed extending to a point where an upper end of the groove part 132B reaches an upper side of the sidewall part 132. The upper end of the groove part 132B is positioned more toward the negative side in the Y axis direction than a midpoint of the sidewall part 132 in the Y axis direction.

The groove parts 134A, 134B are formed in the inner surface of the sidewall part 134 in a similar manner as the groove parts 132A, 132B formed in the sidewall part 132.

Next, a case where a heavy object 500 (hereinafter also simply referred to as "object 500") contacts the cover part 130 of the RFID tag 100 is described with reference to FIG. 4A. For example, in a case where the RFID tag 100 is attached to the object 500 by using a strap or the like (not illustrated in FIG. 4A) and stored inside a warehouse or conveyed, the RFID tag 100 may buried under the object 500 or sandwiched between multiple objects 500.

In such case, the RFID tag 100 may contact the object 500 and be compressed by the object 500 as illustrated in FIG. 4A. Thereby, the cover part 130 may receive stress in the height direction of the sidewall parts 132-135.

In the case where the cover part 130 receives stress in an arrow direction of FIG. 4B, the sidewall parts 132, 134 of the cover part 130 begin to deform toward the negative side in the X axis direction and toward the positive side in the X axis direction, respectively. Upon receiving the stress from the object 500, the sidewall part 132 is folded along the groove parts 132A, 132B. Thereby, the sidewall part 132 is folded outward (i.e. folded toward the negative side in the Z axis direction). Similarly, the sidewall part 134 is also folded along the groove parts 134A, 134B. Thereby, the sidewall part 134 is folded outward (i.e. folded toward the positive side in the Z axis direction).

This occurs because the sidewall part 132 is easily folded upon receiving the stress, in a manner that the groove part 132A is arranged on its inner side. Similarly, the sidewall part 134 is easily folded upon receiving the stress, in a manner that the groove part 132B is arranged on its inner side. The same applies to the sidewall part 134 that includes the groove parts 134A, 134B.

In a case where stress is further exerted to the cover part 130, the sidewall parts 132, 134 are both formed into a completely folded state as illustrated in FIG. 5A. In this state, the sidewall parts 133, 135 are folded on top of the bottom part 131. FIG. 5A illustrates a state in which the cover part 130A is completely folded in the Z axis direction, and the thickness of the cover part 130 in the Z axis direction is thinnest.

FIG. 5B is a cross-sectional view of the RFID tag 100 taken along line A-A of FIG. 5A. As illustrated in FIG. 5B, the sidewall part 132 is in a completely folded state on the bottom part 131, and the sidewall parts 133, 135 are folded and overlapped on the sidewall part 132.

It is preferable to position the IC chip 30 substantially at the center of the bottom part 131 from a plan view. Further, it is also preferable to set the Z-direction lengths of the sidewall parts 133, 135 (FIG. 3A), so that the sidewall parts 133, 135 do not overlap with the IC chip 30 (being positioned substantially at the center of the bottom part 131) even in a case where the sidewall parts 133, 135 are in the completely folded state illustrated in FIGS. 5A and 5B.

Thereby, the sidewall parts 132, 134 can be completely folded as illustrated in FIGS. 5A and 5B. Even in a case where the sidewall parts 133, 135 are overlapped on the bottom part 131, a space can be formed on an upper side above the IC chip 30. None of the sidewall parts 132-135 are positioned inside this space.

Accordingly, even if the cover part 130 of the RFID tag 100 is completed flattened by the object 500 where the sidewall parts 132-135 are in a completely folded state, a space can be provided on an upper side of the IC chip 30. Thereby, the IC chip 30 or a connection part between the IC chip 30 and the antenna 20 can be prevented from being damaged by the pressure exerted from the object 500.

FIGS. 3A to 5B illustrates an embodiment having the groove parts 132A, 132B, 134A, and 134B formed in the sidewall parts 132, 134 of the cover part 130. Alternatively, the sidewall parts 132, 134 may be formed without having the groove parts 132A, 132B, 134A, and 134B.

Although the cover part 130 is easily deformed by the stress exerted from the positive side in the Z axis direction in a case where the groove parts 132A, 132B, 134A, and 134B are formed in the sidewall parts 132, 134, the groove parts 132A, 132B, 134A, and 134B need not be formed as long as the cover part 130 can deform in a similar manner as the case where the groove parts 132A, 132B, 134A, and 134B are formed in the sidewall parts 132, 134.

Next, a comparative example of an RFID tag 100A is described with reference to FIG. 6.

FIG. 6 is a schematic diagram illustrating a state where stress is exerted on the RFID tag 100A of the comparative example. The RFID tag 100A is different from the RFID tag 100 in that the RFID tag 100A includes a cover part 130A having a configuration different from that of the cover part 130 illustrated in FIGS. 3A-5B.

The cover part 130A of the FIG. 6A has a length in the Z axis direction (height) that is greater than that of the cover part 130. Thus, in a state where the cover part 130A is folded, the cover part 130A overlaps the IC chip 30. It is to be noted that FIGS. 6A-6C illustrate sidewall parts 133A and 135A that correspond to the sidewall parts 133 and 135 of the cover part 130 illustrated in FIGS. 3A-5B.

As illustrated with a thick arrow in FIG. 6A, stress is exerted to the cover part 130A from an object 500A, Accordingly, the sidewall part 133A begins to fold as illustrated with a broken-line arrow of FIG. 6B. Then, in a case where the sidewall part 133A overlaps on the bottom part 131, the sidewall part 133A is positioned above the IC chip 30 as illustrated in FIG. 6C.

In this case, the sidewall part 133A is positioned directly above the IC chip 30 when the sidewall part 133A is overlapped on the bottom part 131. Therefore, when the object 500A is pressed against the sidewall part 133A, stress is directly exerted to the IC chip 30 from the sidewall part 133A and the bottom part 131. This leads to breakage of the IC chip 30 or disconnection at a part connecting the IC chip 30 and the antenna 20. The connecting part between the IC chip 30 and the antenna 20 is positioned directly below the IC chip 30.

Accordingly, as illustrated in FIGS. 5A and 5B, each of the lengths of the sidewall parts 133, 135 in the Z axis direction (see, for example, FIG. 3A) is preferred to be set with a length that prevents the sidewall parts 133, 135 from overlapping with the IC chip 30.

Further, FIGS. 5A and 5B illustrate an embodiment in which the sidewall parts 133, 135 are folded inward whereas the sidewall parts 132, 134 are folded outward. This is because the groove parts 132A, 132B, 134A, 134B are formed in the sidewall parts 132, 134, and because the sidewall parts 132, 134 easily folded outward.

However, depending on the direction in which the stress is exerted, the sidewall parts 132, 134 may be folded inward whereas the sidewall parts 133, 135 may be folded outward. Further, each of the sidewall parts 132-135 may be folded inward, outward or in a given direction.

Therefore, not only is it preferable for the lengths of the sidewall parts 133, 135 in the Z axis direction to be lengths that prevent the sidewall parts 133, 135 from overlapping the IC chip 30, but the lengths of the sidewall parts 132, 134 in the Z axis direction are also preferred to be lengths that prevent the sidewall parts 132, 134 from overlapping the IC chip 30.

However, in a case where a predetermined condition(s) is satisfied, the lengths of the sidewall parts 132-135 in the X axis direction may be lengths that cause the sidewall parts 132-135 to overlap with the IC chip 30. For example, in a case where some space remains at an area directly above the IC chip 30 when the sidewall parts 133-135 are not completely folded as illustrated from FIG. 6B to FIG. 6C, the lengths of the sidewall parts 132-135 in the X axis direction may be lengths that cause the sidewall parts 132-135 to overlap with the IC chip 30.

Figure 7:
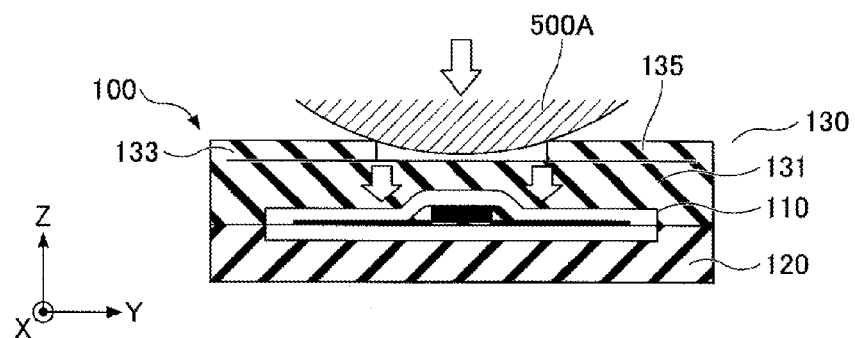
FIG. 7 is a schematic diagram illustrating a state where pressure is exerted from an object to an RFID tag according to the first embodiment of the present invention.

FIG. 7 is a schematic diagram illustrating a state where the RFID tag 100 of the first embodiment is pressed by the object 500A. The object 500A may be, for example, a spherical object or an object having a protruding part. In this embodiment, the object 500A has a spherical shape in which a surface of the spherical object 500A is contacting the RFID tag 100.

In the example illustrated in FIG. 7, the cover part 130 of the RFID tag 100 is pressed by the spherical object 500A, in a state where the sidewall parts 133, 135 are completely folded on the bottom part 131.

The object 500A may exert pressure directly to the bottom part 131 provided directly above the IC chip 30 in a case where the thickness of the sidewall parts 133, 135 (thickness in the Z axis direction of FIG. 7) is large, or in a case where there is a large space between the sidewall part 133 and the sidewall part 135 when the sidewall parts 133, 135 are folded.

Therefore, the thickness of the sidewall parts 133, 135 (thickness in the Y axis direction of FIGS. 3A and 3B) and the length of the sidewall parts 133, 135 in the Z axis direction (see FIGS. 3A and 3B) are preferred to be set with dimensions that prevent pressure from being directly exerted from the object 500A to the bottom part 131 provided directly above the IC chip 30. The dimensions may be set in relation with the dimension of the object 500A.

The embodiment described above illustrates a case of absorbing stress by the cover part and preventing breakage of the IC chip 30 or the connection part between the IC chip 30 and the antenna 20 in a case where stress is exerted to the RFID tag 100.

However, the RFID tag 100 can attain the following effects by including the cover part 130 (particularly, in a case where the object 500 is formed of a metal material).

For example, as illustrated in FIG. 4A, a gap, which is equivalent to the height of the cover part 130 in the Z axis direction, is formed between the IC chip 30 and the object (in this example, a metal object) 500 in a state where the cover part 130 of the RFID tag 100 contacts the metal object 500.

Typically, the radiation characteristics of an antenna deteriorate when the antenna is placed on the surface of a metal object. Thus, it becomes difficult to perform communications. Therefore, in a case of performing communications with an antenna provided in the vicinity of a metal object, a gap of, for example, approximately, 15 mm is preferred to be provided between the antenna and the metal object.

In this aspect, the RFID tag 100 of the first embodiment has a comparatively large gap provided between the IC chip 30 and the metal object 500 in a state where the cover part 130 is contacting the metal object 500. Therefore, by setting the cover part 130 with a height of, for example, 15 mm or more, the antenna 20 can perform communications 20 (see FIGS. 2A-2C) even when positioned in the vicinity of the metal object 500.

With the RFID tag 100 according to the first embodiment, in a state where an end of the cover part 130 toward the positive side in the Z axis direction is contacting the metal object 500 when no stress is exerted on the cover part 130, the inlay 110 can be separated from the metal object 500 at a distance equivalent to the height of the cover part 130.

Further, in a case where pressure is exerted by the object 500 to the cover part 130 toward the positive side in the Z axis direction, stress can be absorbed and a space can be formed directly above the IC chip 30 by folding the sidewall parts 132-135 of the cover part 130. Therefore, the IC chip 30 or the connection part between the IC chip 30 and the antenna 20 can be prevented from being damaged.

When pressure is exerted from the metal object 500 to the cover part 130 in a state where the sidewall parts 132-135 of the cover part 130 are folded, the gap between the antenna 20 and the metal object 500 becomes small. Therefore, the communication performance of the antenna 20 is reduced compared to a case where the sidewall parts 132-135 are erect.

However, the sidewall parts 132-135 can return to their erect positions when the sidewall parts 132-135 are released from the state of receiving pressure from the metal object 500 by removing the metal object 500.

Therefore, even in a case where an end of the cover part 130 toward the positive side in the Z axis direction is contacting the metal object 500 after the sidewall parts 132-135 have returned to their erect positions, the inlay 110 can be separated from the metal object 500 at a distance equivalent to the height of the cover part 130. Accordingly, a satisfactory communication state can be ensured for the RFID tag 100.

In the above-described embodiment, the IC chip 30 and the antenna 20 are included in the inlay 110. That is, the antenna 20 is formed in the sheet part 10, the IC chip 30 is mounted on the sheet part 10, and the sheet part 40 covers the antenna 20 and the IC chip 30.

However, the inlay 110 may be formed without the sheet part 40. Further, the RFID tag 100 may be formed without the sheet parts 10, 40 and have the antenna 20 and the IC chip 30 formed or mounted on one of the cover part 120 and the bottom part 131 of the cover part 130.

Figure 8:
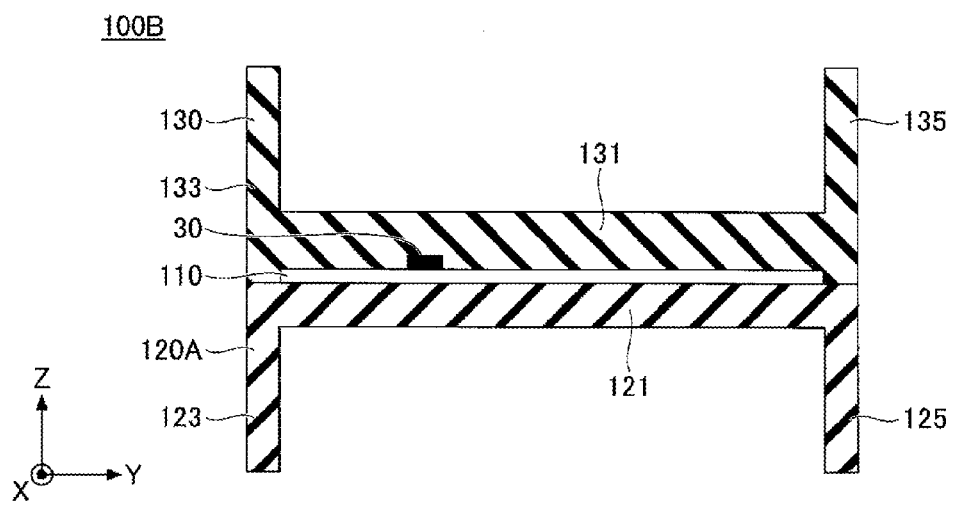
FIG. 8 is a cross-sectional view illustrating an RFID tag according to a first modified example of the first embodiment of the present invention.

The RFID tag 100 of the first embodiment may be modified into a configuration illustrated in FIG. 8.

FIG. 8 is a cross-sectional view illustrating a RFID tag 100B according to a first modified example of the first embodiment.

The RFID tag 100B of FIG. 8 includes the inlay 110, a cover part 120A, and the cover part 130. The configurations of the inlay 110 and the cover part 130 are substantially the same as the configurations of the inlay 110 and the cover part 130 illustrated in FIGS. 1A-5B.

The cover part 120A includes four sidewall parts and a bottom part 121. In FIG. 8, among the four sidewall parts, only sidewall parts 123, 125 are illustrated. The bottom part 121 is substantially the same as the cover part 120 of FIGS. 1A and 1B, and the four sidewall parts are substantially the same as the sidewall parts 132-135 of FIGS. 3A and 3B. The bottom part 121 and the four sidewall parts are substantially the same as the bottom part 131 and the sidewall parts 132-135 of the cover part 130, respectively.

That is, the cover part 120A of FIG. 8 has the cover part 120 of FIGS. 1A and 1B with a frame part added constituted by four sidewall parts.

Thus, assuming that the bottom part 131 and the cover part 121 forma single outer covering member, assuming that an upper surface of the bottom part 131 is the main surface of the outer covering member, and assuming that a lower surface of the cover part 120 is the rear surface of the outer covering member, the RFID tag 100B of FIG. 8 has a frame part provided in each of the main and rear surfaces of the outer covering member.

As illustrated in FIG. 8, the RFID tag 100B has frame parts provided in the cover parts 120A, 130 on both the upper and lower sides of the inlay 110. Therefore, regardless of whether a heavy object 500 is placed on the upper side or the lower side of the RFID tag 100B, the IC chip 30 or the connection part between the IC chip 30 and the antenna 20 can be prevented from being damaged.

Further, in a case where the object 500 is formed of a metal material, the antenna 20 (see FIGS. 2A-2C) can perform communications regardless of whether the metal object 500 contacts the upper side or the lower side of the RFID tag 100B by forming the cover parts 120A and 130 with a thickness of, for example, approximately 15 mm.

Figure 9A:
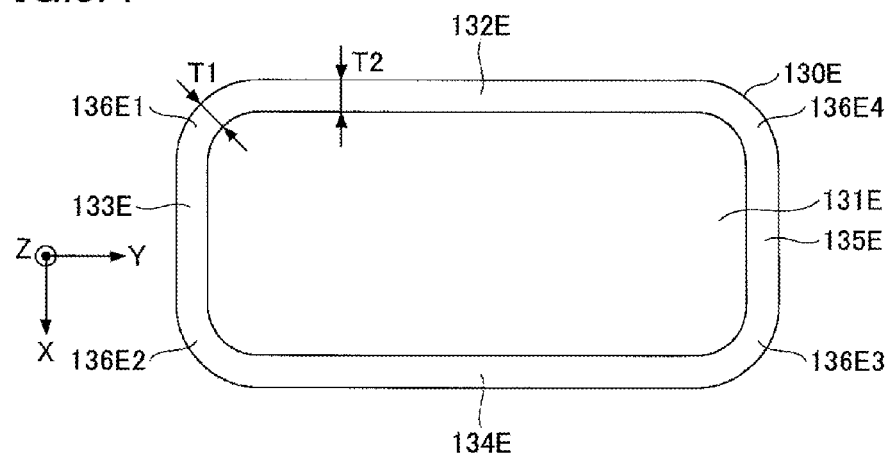
FIGS. 9A-9C are upper plan views illustrating cover parts according to a second modified example of the first embodiment of the present invention.
Figure 9B:
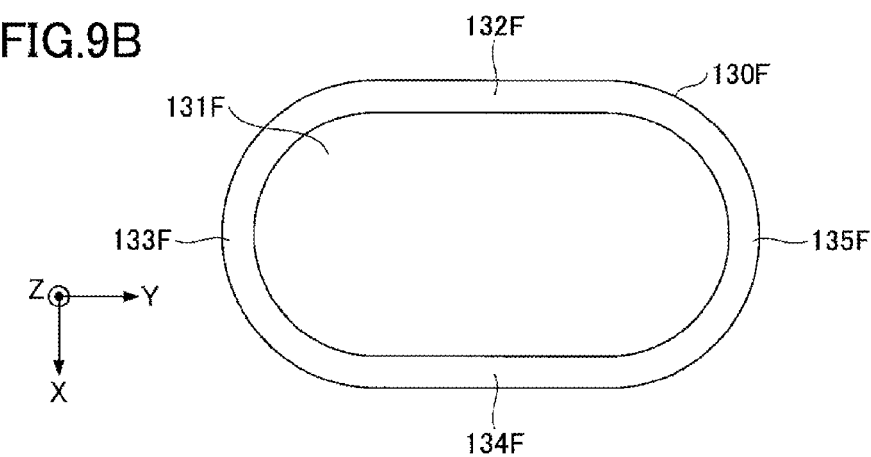
Figure 9C:
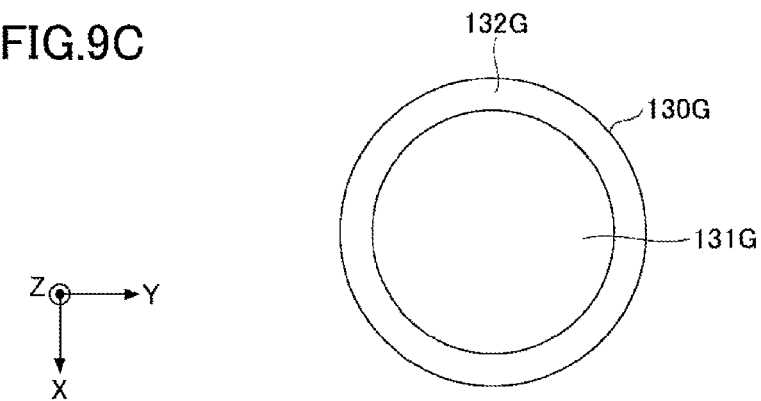

Further, the RFID tag 100 of the first embodiment may be modified to have the configurations illustrated in FIGS. 9A-9C.

FIGS. 9A-9C are upper plan views illustrating cover parts 130E, 130F, and 130G according to the second modified examples of the first embodiment.

As illustrated in FIG. 9A, the cover part 130E includes a bottom part 131E, and sidewall parts 132E, 133E, 134E, and 135E.

The bottom part 131E of the cover part 130E is chamfered, so the four corners of the bottom part 131 are round. In correspondence with the shapes of the four corners of the bottom part 131E, the corner parts 136E1, 136E2, 136E3, and 136E4 of the sidewall parts 132E, 133E, 134E, and 135E are curved to form an arcuate shape from a plan view.

The cover part 130E of FIG. 9A may be used instead of the cover part 130 illustrated in FIGS. 3A and 3B.

It is to be noted that the thickness T1 of the corner parts 136E, 136E2, 136E3, and 136E4 of the corner part 130E may be less than the thickness of an straight (not curved) part of the sidewall parts 132E, 133E, 134E, and 135E.

Accordingly, by forming each of the corner parts 136E1, 136E2, 136E3, and 136E4 with a thickness less than the thickness of each of the sidewall parts 132E, 133E, 134E, and 135E, the cover part 130E can easily deform (flex) in a case where stress is exerted to the cover part 130E.

Alternatively, the cover part 130F may be formed having an elliptical shape from a plan view as illustrated in FIG. 9B, or the cover part 130G may be formed having a circular shape from a plan view as illustrated in FIG. 9C.

The cover part 130F of FIG. 9B includes a bottom part 131F, and sidewall parts 132F, 133F, 134F, and 135F. The bottom part 131F has a plan view shape in which a semicircle is added to each side of a rectangular shape (elliptical or racetrack shape). Each of the sidewall parts 132F, 134F has a flat shape. Each of the sidewall parts 133F, 135F has a shape similar to a semi-circle formed by dividing a cylinder along its center axis.

The sidewall parts 133F, 135 may be formed with a thickness that is less than a thickness of the sidewall parts 132F, 134F for increasing flexibility (bendability) when stress is exerted to the cover part 130F.

The cover part 130F illustrated in FIG. 9B may be used instead of the cover part 130 illustrated in FIGS. 3A and 3B.

The cover part 130G illustrated in FIG. 9C includes a bottom part 131G and a sidewall part 132G. The bottom part 131G has a circular shape from a plan view, and a sidewall part 132G has a circular cylindrical shape from a plan view. Alternatively, the plan view shapes of the bottom part 131G and the sidewall part 132G may be elliptical shapes.

The cover part 130G illustrated in FIG. 9C may be used instead of the cover part 130 illustrated in FIG. 3.

Next, a relationship between the width and the depth of the groove part 132A of the sidewall part 132 of FIG. 3A is described with reference to FIGS. 10A-10D. Although the groove part 132A of FIG. 3A is formed diagonally in the rectangular side surface of the sidewall part 132, the sidewall part 132 of FIGS. 10A-10D is described to have a groove part 132A that is formed in a horizontal direction by removing a portion of the sidewall part 132. Further, apart of the sidewall part 132 provided in a position higher than the groove part 132A is referred to as a sidewall part 132U, and a part of the sidewall part 132 provided in a position lower than the groove part 132A is referred to as a sidewall part 132L.

Figure 10C:
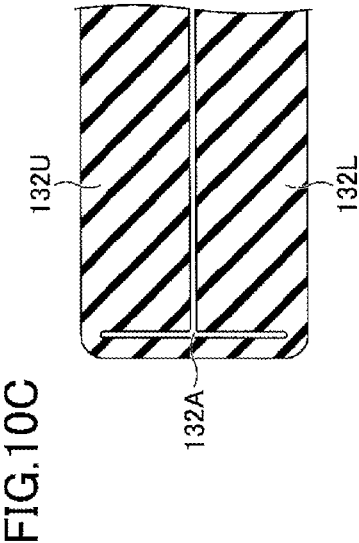
FIGS. 10A-10D are schematic diagrams for describing a relationship between a width and depth of a groove part of a sidewall part according to an embodiment of the present invention.
Figure 10D:
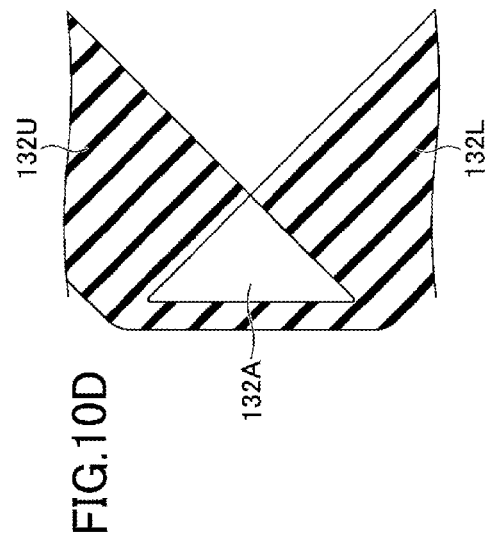
Figure 10A:
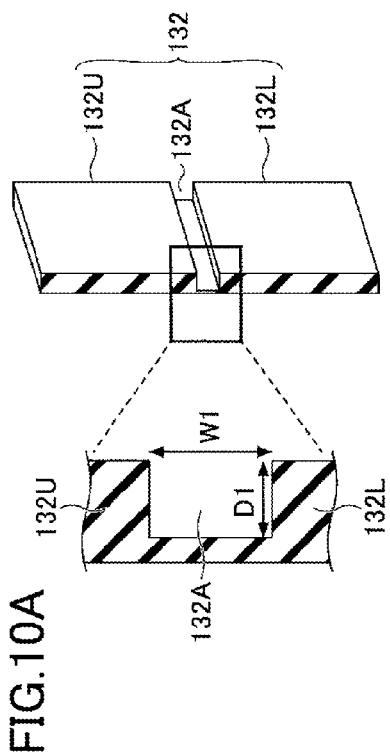
Figure 10B:
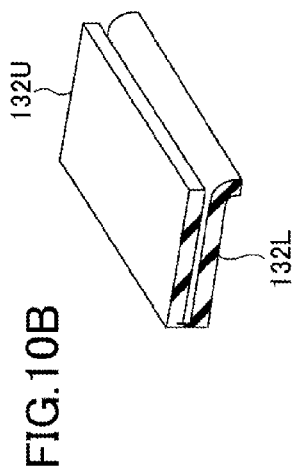

An enlarged view of the groove part 132A is illustrated on the left side of FIG. 10A. In a case where stress is exerted to the sidewall part 132 in a vertical direction of FIG. 10A, the sidewall part 132U is folded to overlap the sidewall part 132L in a state where the groove part 132A is provided in an inner side of the sidewall part 132U.

Therefore, the width W1 of the groove part 132A of FIG. 10A and the depth D1 of the groove part 132A of FIG. 10A are preferably set to satisfy a relationship of: $W1 \geq 2 \times D1$.

If the width W1 of the groove part 132A and the depth D1 of the groove part 132A satisfy the relationship of $W1 \geq 2 \times D1$, the sidewall part 132U and the sidewall part 132L can be folded to fit inside the groove part 132A as illustrated in FIG. 10C. Thereby, the sidewall part 132U and the sidewall part 132L are folded to completely overlap each other.

On the other hand, if the width W1 of the groove part 132A and the depth D1 of the groove part 132A do not satisfy the relationship of $W1 \geq 2 \times D1$, the sidewall part 132U and the sidewall part 132L cannot be folded inside the groove part 132A as illustrated in FIG. 10D. Therefore, the sidewall part 132 and the sidewall part 132L interfere with each other. Thus, it is possible that the sidewall part 132 cannot be folded completely.

The groove part 132A is preferred to be formed, so that the width W1 of the groove part 132A and the depth D1 of the groove part 132A satisfy the relationship of $W1 \geq 2 \times D1$. This also applies to the groove parts 132B, 134A, and 134B.

The width W1 of the groove part 132A and the depth D1 of the groove part 132A may be set with optimum dimensions by considering, for example, bendability, strength, and endurance during folding.

Next, a relationship between the dimension of each of the bottom part 1 and the sidewall parts 132-135 of the cover part 135 and a position of the IC chip 30 are described with reference to FIGS. 11A-11B.

Figure 11A:
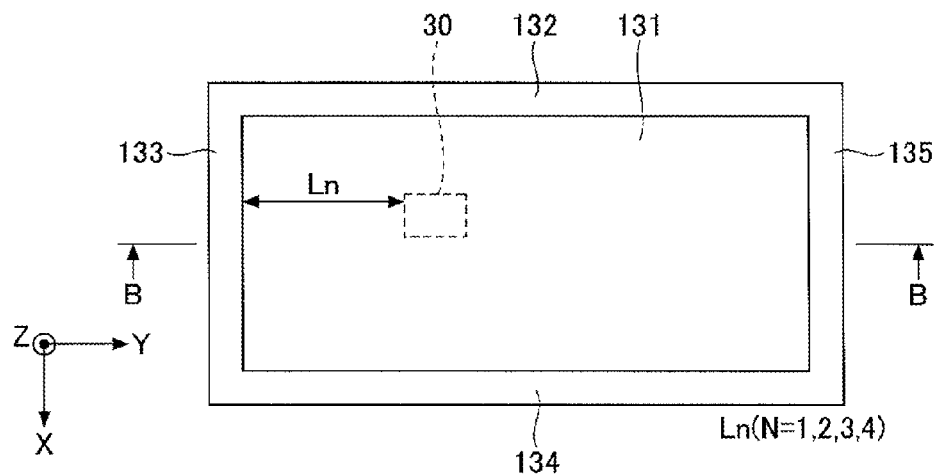
FIGS. 11A-11B are schematic diagrams for describing a relationship between dimensions of a bottom part and sidewall parts of a cover part and a position of an IC chip according to an embodiment of the present invention.
Figure 11B:
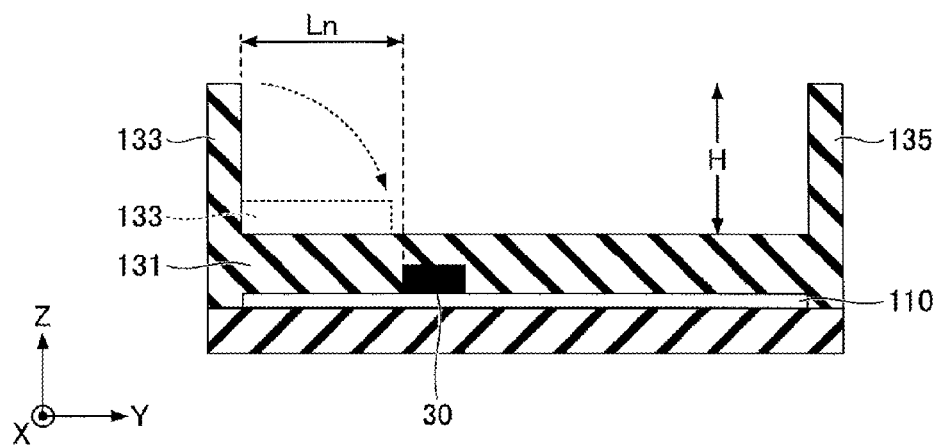

FIGS. 11A-11B are schematic diagrams illustrating a relationship between the dimension of each of the bottom part 1 and the sidewall parts 132-135 of the cover part 130 and a position of the IC chip 30. FIG. 11A is a plan view, and FIG. 11B is a cross-sectional view taken along line B-B of FIG. 11A. In FIGS. 11A-11B, the groove parts 132A, 132B, 134A, and 134B are not illustrated for the sake of convenience.

As illustrated in FIGS. 11A and 11B, "Ln (n=1-4)" is assumed to be the length from an inner surface of each of the sidewall parts 132-135 to the IC chip 30. As illustrated in FIG. 11B, "H" is assumed to be the height (length in the Z axis direction) of each of the sidewall parts 132-135 from a surface of the bottom part 131.

In a case where the sidewall part 133 is folded toward an inner side of the cover part 130 as illustrated with a broken-line in FIG. 11B, the sidewall part 133 is preferred not to be positioned directly above the IC chip 30. Therefore, the length L1 from the inner surface of the sidewall part 133 to the IC chip 30 is preferred to satisfy a relationship of L1>H.

Similarly, the lengths L2, L3, L4 from the inner surfaces of the sidewall parts 132, 134, 135 to the IC chip 30 are preferred to satisfy relationships of L2>H1, L3>H1, L4>H1, respectively.

In a case where the lengths L1, L2, L3, L4 from the inner surfaces of the sidewall parts 132, 133, 134, 135 to the IC chip 30 are greater than the heights H of the sidewall parts 132-135 from the surface of the bottom part 131, the sidewall parts 132-135 can be prevented from being positioned directly above the IC chip 30 when the sidewall parts 132-135 are folded toward the inner side of the cover part 130.

Therefore, the IC chip 30 or the connection part between the IC chip 30 and the antenna 20 can be effectively prevented from being damaged. Thus, a significantly reliable RFID tag 100 can be provided.

Next, an RFID tag 100H according to a third modified example of the first embodiment is described with reference to FIGS. 12A-12C.

Figure 12A:
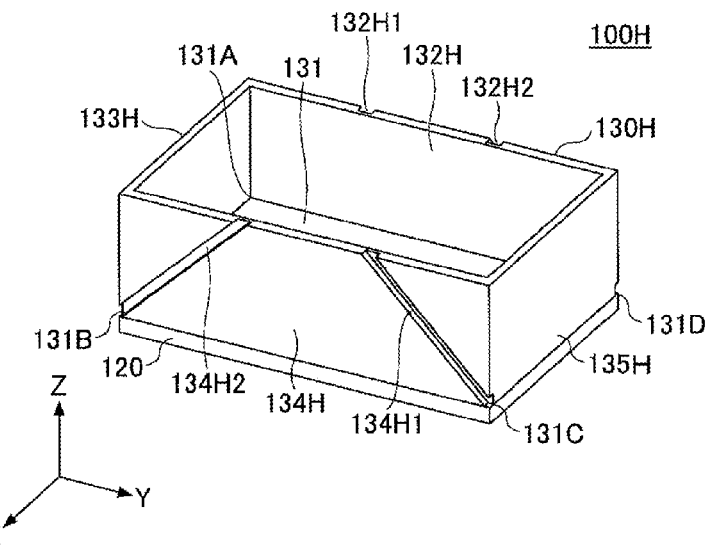
FIGS. 12A-12C are schematic diagrams for describing an RFID tag according to a third modified example of the first embodiment of the present invention.
Figure 12B:
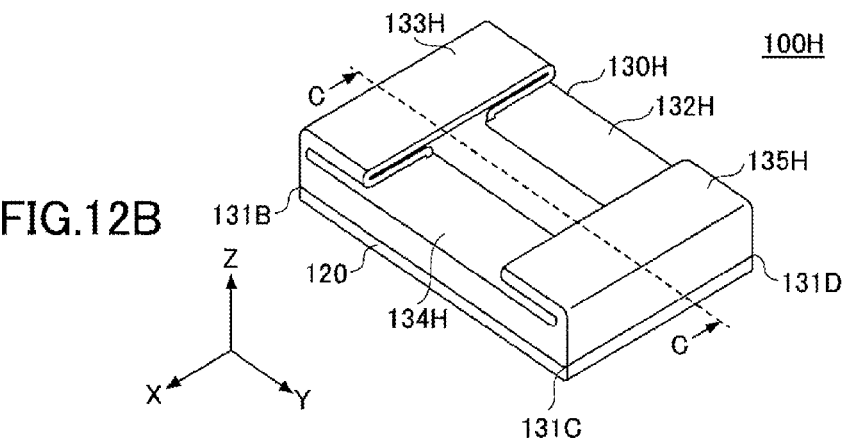
Figure 12C:
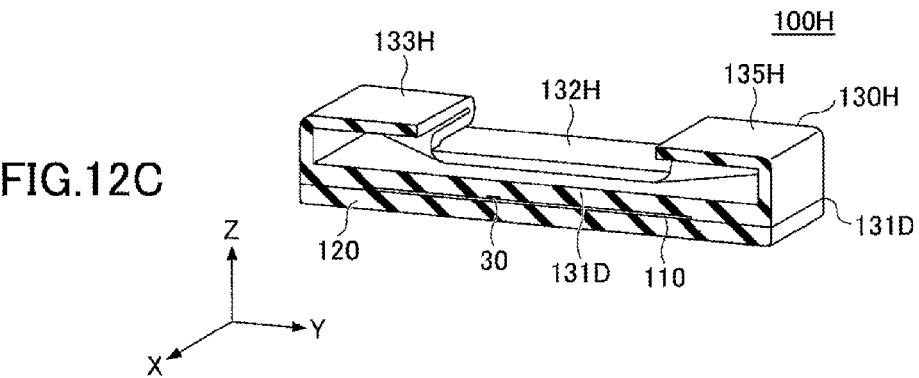

FIGS. 12A-12C are schematic diagrams illustrating the RFID tag 100H according to the third modified example of the first embodiment. FIG. 12A is a perspective view, FIG. 12B is another perspective view illustrating a folded state, and FIG. 12C is a cross-sectional view taken along line C-C of FIG. 12B.

As illustrated in FIGS. 12A-12C, the RFID tag 100H includes the inlay 110, the cover part 120, and a cover part 130H. The configurations of the inlay 110 and the cover part 130 are substantially the same as the configurations of the inlay 110 and the cover part 130 illustrated in FIGS. 3A-5B.

The cover part 130H includes the bottom part 131, and sidewall parts 132H, 133H, 134H, and 135H.

The bottom part 131 is a thin plate-like part of the cover part 130H. The plan view shape of the bottom part 131 is rectangular and has substantially the same size as the cover part 120 (see FIG. 1B). The bottom part 131 is the same as the bottom part 131 illustrated in FIG. 3A-5B.

The sidewall parts 132H-135H are erected as a frame from the four sides of the bottom part 131. The sidewall parts 132H-135H are substantially the same as the sidewall parts 132-135 illustrated in FIGS. 3A-5B. However, the sidewall parts 132H-135H are different from the sidewall parts 132-135 in that groove parts 132H1 and 132H2 are formed on an outer surface of the sidewall part 132H and groove parts 134H1 and 134H2 are formed on an outer surface of the sidewall part 134H.

The groove part 132H1 extends from the vertex 131A of the bottom part 131 toward the positive side in the Y axis direction and the positive side in the Z axis direction. The groove part 132H1 is formed extending to a point where an upper end of the groove part 132H1 reaches an upper side of the sidewall part 132H. The upper end of the groove part 132H1 is positioned more toward the negative side in the Y axis direction than a midpoint of the sidewall part 132H in the Y axis direction. The groove part 132H1 has a configuration in which the groove part 132H1 of FIG. 3A is moved to the outer surface of the sidewall part 132.

The groove part 132H2 is axially symmetric to the groove part 132H1 from a Y-Z plane view. The axis of symmetry between the groove part 132H1 and the groove part 132H2 is parallel to the Z axis and runs through a midpoint of the Y-direction length of the sidewall part 132H. The groove part 132H2 extends from the vertex 131D of the bottom part 131 toward the negative side in the Y axis direction and the positive side in the Z axis direction. The groove part 132H2 is formed extending to a point where an upper end of the groove part 132H2 reaches an upper side of the sidewall part 132H. The upper end of the groove part 132H2 is positioned more toward the positive side in the Y axis direction than a midpoint of the sidewall part 132H in the Y axis direction. The groove part 132H2 has a configuration in which the groove part 132H2 of FIG. 3A is moved to the outer surface of the sidewall part 132.

The groove parts 134H1, 134H2 are formed in the outer surface of the sidewall part 134H in a similar manner as the groove parts 132H1, 132H2 formed in the sidewall part 132H.

In a case where stress is exerted to the cover part 130H, the sidewall parts 132H, 134H are completely folded as illustrated in FIG. 12B. In this state, the sidewall parts 133H, 135H are folded on top of the bottom part 131. FIG. 12B illustrates a state in which the cover part 130H is completely folded in the Z axis direction, and the cover part 130H in the Z axis direction is thinnest.

FIG. 12C is a cross-sectional view of the RFID tag 100H taken along line C-C of FIG. 12B. As illustrated in FIG. 12C, the sidewall part 132H is in a completely folded state on the bottom part 131, and the sidewall parts 133H, 135H are folded and overlapped on the sidewall part 132H.

It is preferable to position the IC chip 30 substantially at the center of the bottom part 131 from a plan view. Further, it is also preferable to set the Z-direction lengths of the sidewall parts 133H, 135H (FIG. 12A), so that the sidewall parts 133H, 135H do not overlap the IC chip 30 (being positioned substantially at the center of the bottom part 131) even in a case where the sidewall parts 133H, 135H are in the completely folded state illustrated in FIGS. 12B and 12C.

Thereby, the sidewall parts 132H, 134H can be completely folded as illustrated in FIGS. 12B and 12C. Even in a case where the sidewall parts 133H, 135H are overlapped on the bottom part 131, a space can be formed on an upper side above the IC chip 30. None of the sidewall parts 132H-135H are positioned inside this space.

Accordingly, even if the cover part 130H of the RFID tag 100H is completed flattened by the object 500 (see FIG. 4) where the sidewall parts 132H-135H are in a completely folded state, a space can be provided on an upper side of the IC chip 30. Thereby, the IC chip 30 or a connection part between the IC chip 30 and the antenna 20 can be prevented from being damaged by the pressure exerted by the object 500.

Next, a cover part 130I according to a fourth modified example of the first embodiment is described with reference to FIGS. 13A-13C.

Figure 13A:
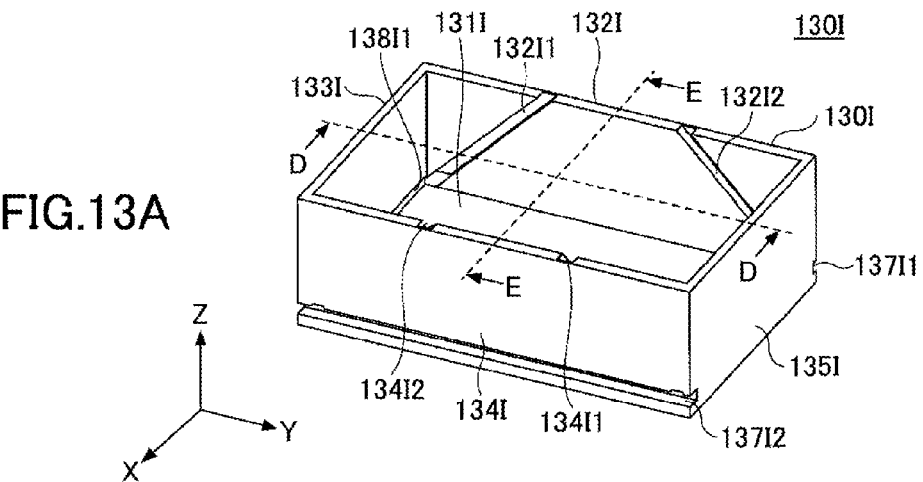
FIGS. 13A-13C are schematic diagrams illustrating a cover part according to a fourth modified example of the first embodiment of the present invention.
Figure 13B:
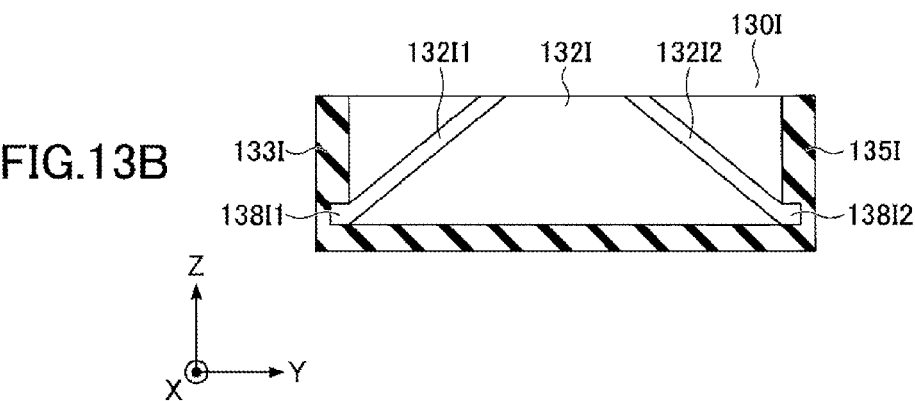
Figure 13C:
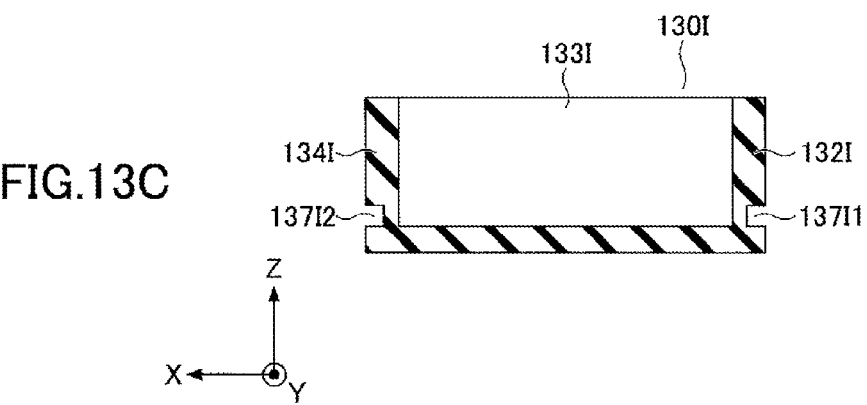

FIGS. 13A-13C are schematic diagrams illustrating the cover part 130I according to the fourth modified example of the first embodiment. FIG. 13A is a perspective view, FIG. 13B is a cross-sectional view taken along line D-D of FIG. 13A, and FIG. 13C is a cross-sectional view taken along line E-E of FIG. 13A.

As illustrated in FIG. 13A, the cover part 130I includes the bottom part 131I, and sidewall parts 132I, 133I, 134I, and 135I.

The bottom part 131I is a thin plate-like part of the cover part 130I. The plan view shape of the bottom part 131I is rectangular and has substantially the same size as the cover part 120 (see FIG. 1B). The bottom part 131I is the same as the bottom part 131 illustrated in FIG. 3A-5B.

The sidewall parts 132I-135I are erected as a frame from the four sides of the bottom part 131I. The sidewall parts 132I-135I are substantially the same as the sidewall parts 132-135 illustrated in FIGS. 3A-5B. The sidewall part 132I includes groove parts 132I1, 132I2 that are substantially the same as the groove parts 132A, 132B of the sidewall part 132 illustrated in FIGS. 3A-5B. Further, the sidewall part 134I includes groove parts 134I1, 134I2 that are substantially the same as the groove parts 134A, 134B of the sidewall part 134 illustrated in FIGS. 3A-5B.

However, the sidewall parts 132I-135I are different from the sidewall parts 132-135 in that the groove parts 137I1 and 137I2 are formed on a lower side of an outer surface of the sidewall parts 132I, 134I, and groove parts 138I1 and 138I2 are formed on a lower side of an inner surface of the sidewall parts 133I, 135I.

The groove part 137I1 is formed on the lower side of the outer surface of the sidewall part 132I along the surface of the bottom part 131I. The groove part 137I2 is formed on the lower side of the outer surface of the sidewall part 134I along the surface of the bottom part 131I. The height of the groove part 137I1 and the height of the groove part 137I2 are substantially the same as the surface of the bottom part 131I. The groove parts 137I1 and the groove part 137I2 are both formed along the Y axis. The groove part 137I1 may be formed in communication with the lower ends of the groove parts 132I1, 132I2. The groove part 137I2 may be formed in communication with the lower ends of the groove parts 134I1, 134I2.

The groove part 138I1 is formed on the lower side of the inner surface of the sidewall part 133I along the surface of the bottom part 131I. The groove part 138I2 is formed on the lower side of the inner surface of the sidewall part 135I along the surface of the bottom part 131I. The height of the groove part 138I1 and the height of the groove part 138I2 are substantially the same as the surface of the bottom part 131I.

By providing the groove part 137I1, the groove part 137I2, the groove part 138I1, and the groove part 138I2 in the cover part 130I, the sidewall parts 132I-135I can fold more easily. Thus, in a case where stress is exerted to the cover part 130I, the cover part 130I can attain a structure that can absorb the stress more easily.

Figure 14A:
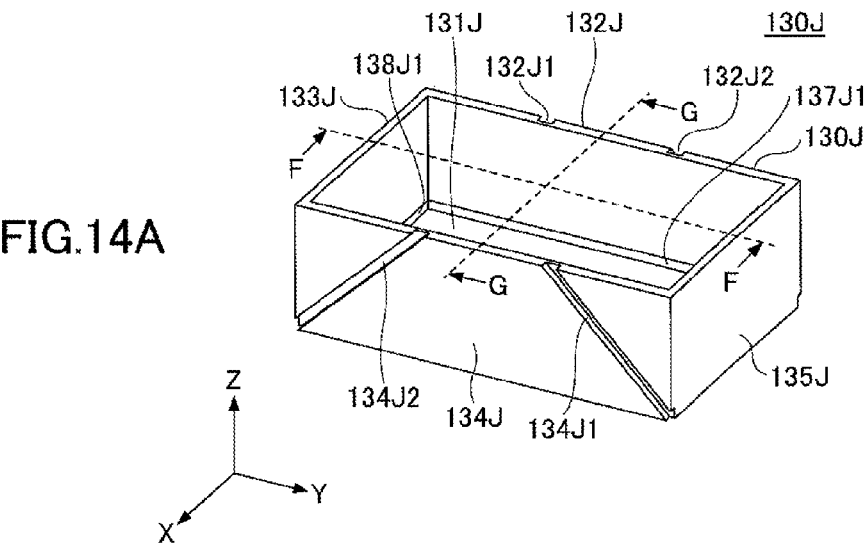
FIGS. 14A-14C are schematic diagrams illustrating a cover part according to an embodiment of the present invention.
Figure 14B:
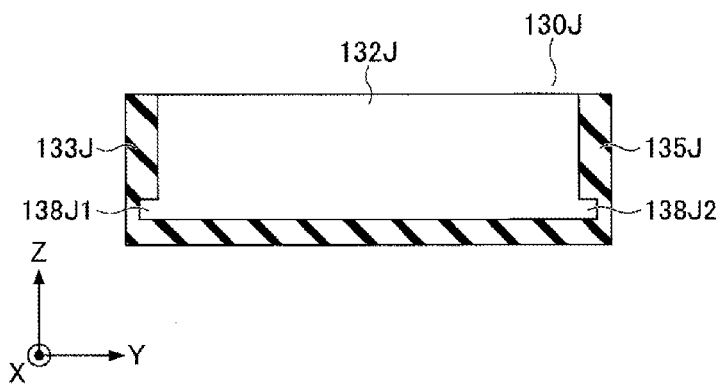
Figure 14C:
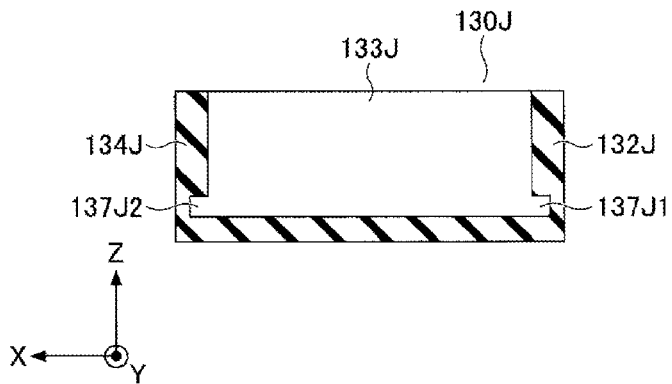

It is to be noted that, as illustrated in FIGS. 14A-14C, the groove parts 132I1, 132I2, 134I1, and 134I2 may be formed on the outer surface of the sidewall part 132I, 134I, respectively.

FIGS. 14A-14C are schematic diagrams illustrating a cover part 130J that is a modified example of the cover part 130I of FIGS. 13A-13C. The cover part 130J of FIGS. 14A-14C has a configuration in which the groove parts 132I, 132I2, 134I1, 134I2 of FIGS. 13A-13C are moved to the outer surfaces of the sidewall parts 132I, 134I and the groove parts 137I1, 137I2 are moved to the inner sides of the sidewall parts 132I, 134I.

The groove parts 132J1, 132J2 are formed in the outer surface of the sidewall part 132J. The groove parts 134J1, 134J2 are formed in the outer surface of the sidewall part 134J. Further, the groove part 137J1 is formed in the inner surface of the sidewall part 132J. The groove part 137J2 is formed in the inner surface of the sidewall part 134J.

Whether to form the groove parts 132I1, 132I2, 134I1, and 134I2 in the inner surfaces of the sidewall parts 132I, 134I as illustrated in FIGS. 13A-13C may be arbitrarily determined according to, for example, the stress that is applied to the cover part 130I or the usage of the RFID tag 100. Similarly, whether to form the groove parts 132J1, 132J2, 134J1, and 134J2 in the outer surfaces of the sidewall parts 132J, 134J as illustrated in FIGS. 14A-14C may be arbitrarily determined according to, for example, the stress that is applied to the cover part 130J or the usage of the RFID tag 100.

It is to be noted that a groove part may be formed in the cover part 130F illustrated in FIG. 9B.

Figure 15A:
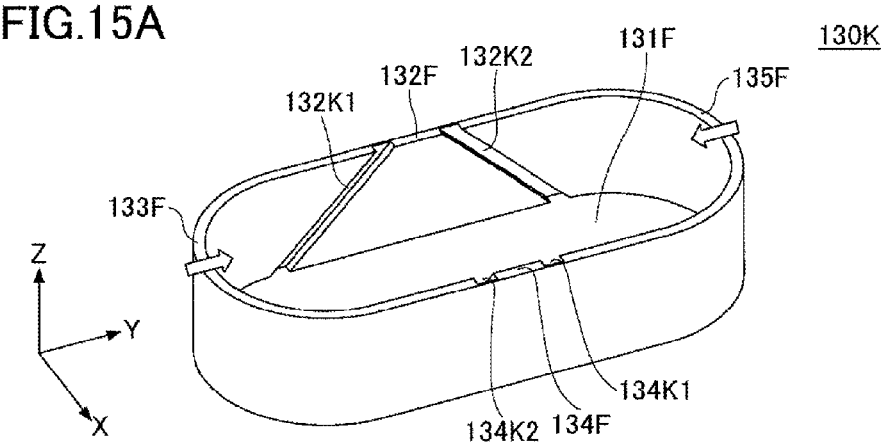
FIGS. 15A-15C are schematic diagrams illustrating a cover part according to an embodiment of the present invention.
Figure 15B:
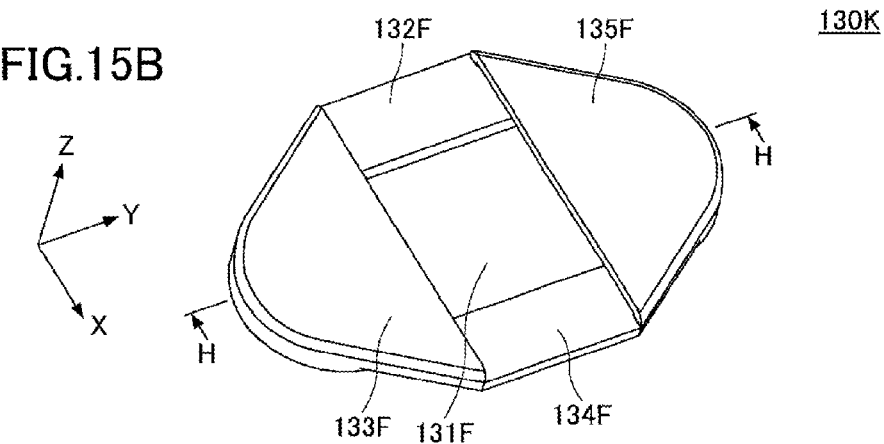
Figure 15C:
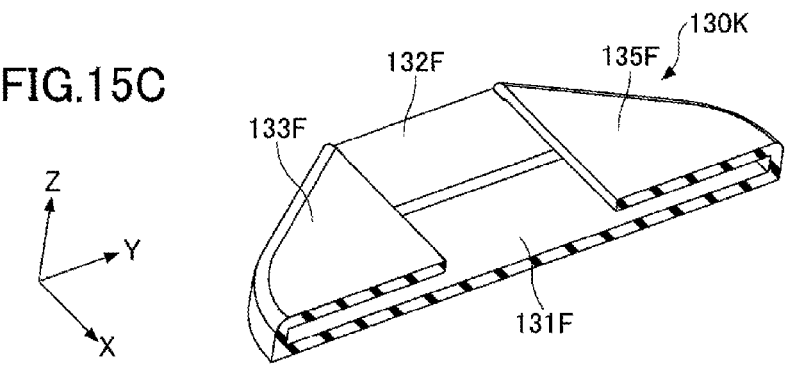

FIGS. 15A-15C illustrate a cover part 130K. The cover part 130K has a configuration in which groove parts 132K1, 132K2, 134K1, and 134K2 are added to the cover part 130F illustrated in FIG. 9B. FIG. 15A is a perspective view, FIG. 15B is another perspective illustrating a folded state, and FIG. 15C is a cross-sectional view taken along line H-H of FIG. 15B.

The cover part 130K includes the bottom part 131F and the sidewall parts 132F, 133F, 134F, and 135F. The bottom part 131F and the sidewall parts 132F, 133F, 134F, and 135F are substantially the same as those included in the cover part 130F of FIG. 9B.

The groove parts 132K1 and 132K2 are formed in the inner surface of the sidewall part 132F. The groove part 132K1 extends from its lower end at a border between the sidewall part 132F and the sidewall part 133F toward the positive side in the Y axis direction and the positive side in the Z axis direction. The groove part 132K1 is formed extending to a point where an upper end of the groove part 132K reaches an upper side of the sidewall part 132F. The upper end of the groove part 132K1 is positioned more toward the negative side in the Y axis direction than a midpoint of the sidewall part 132F in the Y axis direction.

The groove part 132K2 is axially symmetric to the groove part 132K1 from a Y-Z plane view. The axis of symmetry between the groove part 132K1 and the groove part 132K2 is parallel to the Z axis and runs through a midpoint of the Y-direction length of the sidewall part 132F. The groove part 132K2 extends from its lower end at a border between the sidewall part 132F and the sidewall part 135F toward the negative side in the Y axis direction and the positive side in the Z axis direction. The groove part 132K2 is formed extending to a point where an upper end of the groove part 132K2 reaches an upper side of the sidewall part 132F. The upper end of the groove part 132K2 is positioned more toward the positive side in the Y axis direction than a midpoint of the sidewall part 132F in the Y axis direction.

The groove parts 134K1, 134K2 are formed in the inner surface of the sidewall part 134F in a similar manner as the groove parts 132K1, 132K2 formed in the sidewall part 132F.

In a case where stress is exerted to the cover part 130K, the sidewall parts 133F, 135F are folded inward to the bottom part 131F, and the sidewall parts 132F, 134F are folded outward of the cover part 130K.

In this case, by setting the height of the sidewall parts 132F-135F to be less than the lengths from the inner surfaces of the sidewall parts 132F-135F to the IC chip 30, the sidewall parts 132F-135F can be prevented from being positioned at the center of the bottom part 131F even in a case where the sidewall parts 132F-135F are folded as illustrated in FIGS. 15B and 15C.

Thereby, the IC chip 30 or a connection part between the IC chip 30 and the antenna 20 can be prevented from being damaged by the pressure exerted from the object 500.

Next, a RFID tag 100L according to a fifth modified example of the first embodiment is described with reference to FIG. 16.

Figure 16:
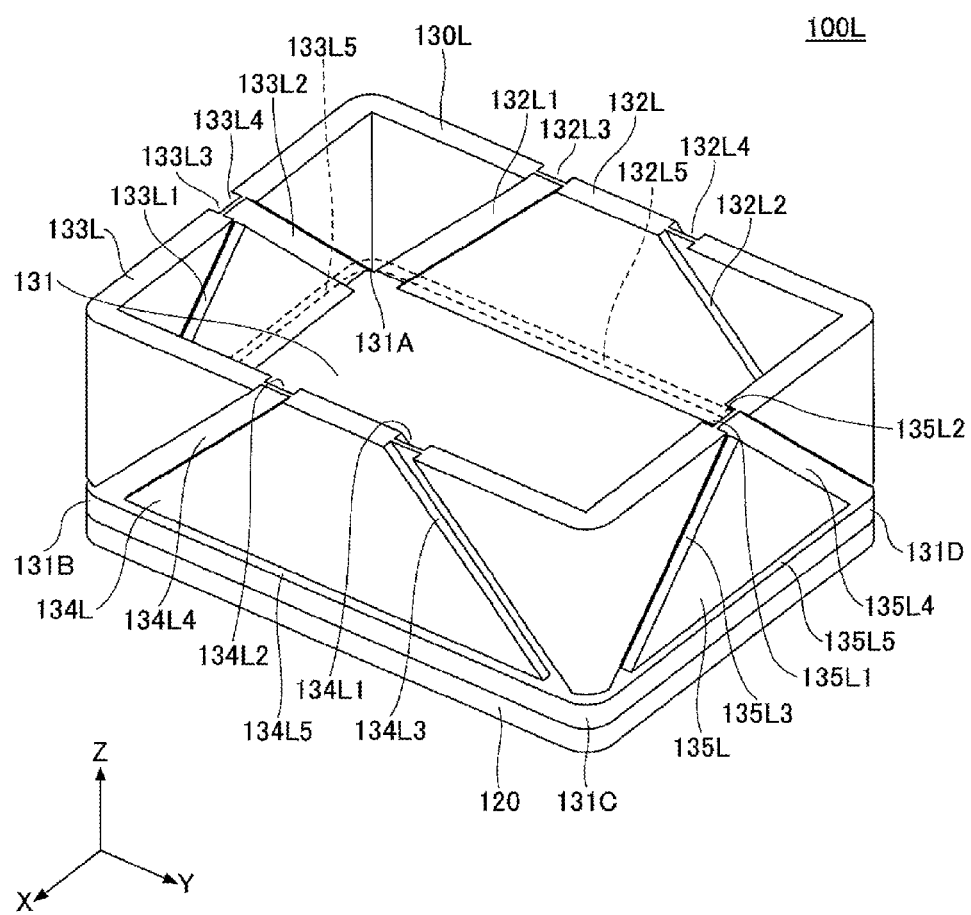
FIG. 16 is a perspective view illustrating an RFID tag according to a fifth modified example of the first embodiment of the present invention.

FIG. 16 is a perspective view illustrating the RFID tag 100L according to the fifth modified example of the first embodiment.

The RFID tag 100L includes the cover part 120 and a cover part 130L. Although not illustrated in FIG. 16, the inlay 110 illustrated in FIG. 1B and FIGS. 2A-2C is provided between the cover part 120 and the cover part 130L of FIG. 16.

The cover part 130L includes the bottom part 131, and sidewall parts 132L, 133L, 134L, and 135L.

The sidewall parts 132L-135L are erected as a frame from the four sides of the bottom part 131. Similar to the sidewall parts 132-135 of FIGS. 3A-3C, the border parts between the sidewall parts 132L-135L (border parts provided above corner parts (vertexes) 131A-131D) are curved from a plan view.

It is to be noted that the thicknesses of the curved parts of the border parts between the sidewall parts 132-135 may be less than the thicknesses of the straight parts of the sidewall parts 132-135 from a plan view. This is the same as the cover part 130E of the second modified example of the first embodiment (see FIG. 9A).

The groove parts 132L1, 132L2, 133L1, 133L2, 134L1, 134L2, 135L1, and 135L2 are formed in the inner surfaces of corresponding sidewall parts 132L-135L.

The groove part 132L1 extends from the vertex 131A of the bottom part 131 toward the positive side in the Y axis direction and the positive side in the Z axis direction. The groove part 132L1 is formed extending to a point where an upper end of the groove part 132L1 reaches an upper side of the sidewall part 132L. The upper end of the groove part 132L1 is positioned more toward the negative side in the Y axis direction than a midpoint of the sidewall part 132L in the Y axis direction.

The groove part 132L2 is axially symmetric to the groove part 132L1 from a Y-Z plane view. The axis of symmetry between the groove part 132L1 and the groove part 132L2 is parallel to the Z axis and runs through a midpoint of the Y-direction length of the sidewall part 132L. The groove part 132L2 extends from the vertex 131D of the bottom part 131 toward the negative side in the Y axis direction and the positive side in the Z axis direction. The groove part 132L2 is formed extending to a point where an upper end of the groove part 132L2 reaches an upper side of the sidewall part 132L. The upper end of the groove part 132L2 is positioned more toward the positive side in the Y axis direction than a midpoint of the sidewall part 132L in the Y axis direction.

The groove parts 134L1, 134L2 are formed in the inner surface of the sidewall part 134L in a similar manner as the groove parts 132L1, 132L2 formed in the sidewall part 132L.

Further, the groove part 133L1 extends from the vertex 131B of the bottom part 131 toward the negative side in the X axis direction and the positive side in the Z axis direction. The groove part 133L1 is formed extending to a point where an upper end of the groove part 133L1 reaches an upper side of the sidewall part 133L. The upper end of the groove part 133L1 is positioned at a midpoint of the sidewall part 133L in the X axis direction and is connected to the groove part 133L2.

The groove part 133L2 is axially symmetric to the groove part 133L1 from a Y-Z plane view. The axis of symmetry between the groove part 133L1 and the groove part 133L2 is parallel to the Z axis and runs through a midpoint of the X-direction length of the sidewall part 133L. The groove part 133L2 extends from the vertex 131A of the bottom part 131 toward the positive side in the X axis direction and the positive side in the Z axis direction. The groove part 133L2 is formed extending to a point where an upper end of the groove part 133L2 reaches an upper side of the sidewall part 133L. The upper end of the groove part 133L2 is positioned at a midpoint of the sidewall part 133L in the Y axis direction and is connected to the groove part 133L1.

The groove parts 135L1, 135L2 are formed in the inner surface of the sidewall part 135L in a similar manner as the groove parts 133L1, 133L2 formed in the inner surface of the sidewall part 133L.

Further, the groove parts 132L3, 132L4, 133L3, 133L4, 134L3, 134L4, 135L3, and 135L4 are formed in the outer surfaces of corresponding sidewall parts 132L-135L.

The groove parts 132L3 and 132L4 are formed in the outer surface of the sidewall part 132 in positions corresponding to the groove parts 132L1 and 132L2. That is, the groove parts 132L3 and 132L4 are formed in positions overlapping the groove parts 132L1 and 132L2 in the Y-Z plan view.

This positional relationship also applies to the relationships between the groove parts 133L3/133L4 and the groove parts 133L1/133L2, between the groove parts 134L3/134L4 and the groove parts 134L1/134L2, and between the groove parts 135L3/135L4 and the groove parts 135L1/135L2.

The groove parts 132L5, 133L5, 134L5, 135L5 are formed at the bottom parts of the outer surfaces of the sidewall parts 132L-135L. The groove parts 132L5, 133L5, 134L5, 135L5 are positioned to have substantially the same height as the surface of the bottom part 131. The groove parts 132L5, 133L5, 134L5, 135L5 are formed to extend along the bottom ends of the sidewall parts 132L-135L in the longitudinal directions of the sidewall parts 132L-135L, respectively.

Accordingly, in the cover part 130L, the groove parts 132L1-135L1, 132L2-135L2, 132L3-135L3, and 132L4-135L4 are formed in the inner and outer surfaces of corresponding sidewall parts 132L-135L, and the groove parts 132L5-135L5 are formed at the lower ends of the outer surfaces of the sidewall parts 132L-135L.

Thereby, in a state where an end of the cover part 130L toward the positive side in the Z axis direction is contacting the object 500 when no stress is exerted to the cover part 130L, the inlay 110 can be separated from the object 500 at a distance equivalent to the height of the cover part 130L.

Further, in a case where pressure is exerted by the object 500 to the cover part 130L toward the negative side in the Z axis direction, stress can be absorbed and a space can be formed directly above the IC chip 30 by folding the sidewall parts 132L-135L of the cover part 130L. Therefore, the IC chip 30 or the connection part between the IC chip 30 and the antenna 20 can be prevented from being damaged.

Second Embodiment

Figure 17A:
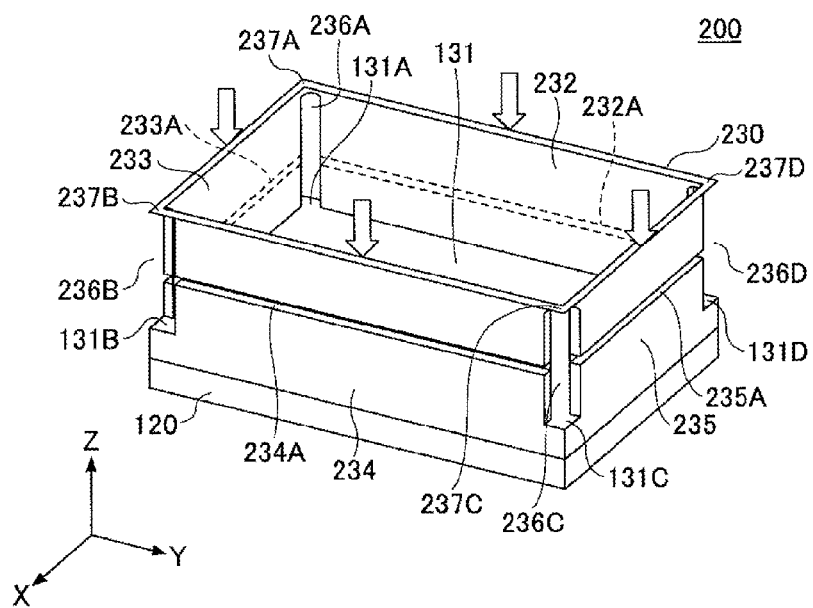
FIGS. 17A-17B are schematic diagrams illustrating an RFID tag according to a second embodiment of the present invention.
Figure 17B:
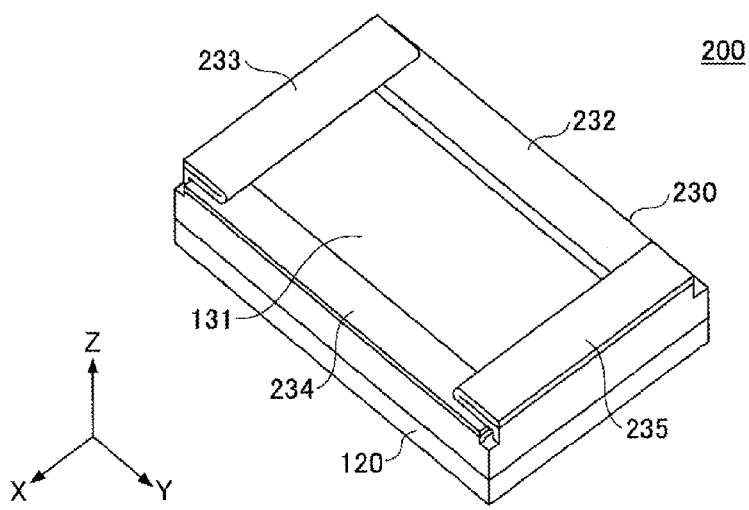

FIGS. 17A-17B are schematic diagrams illustrating an RFID tag 200 according to a second embodiment of the present invention. FIG. 17A is a perspective view, and FIG. 17B is another perspective view illustrating a state of a cover part 230 being folded by stress exerted to the RFID tag 200.

The RFID tag 200 of the second embodiment is different from the RFID tag 100 in that the configuration of the cover part 230 is different from the configuration of the cover part 130 of the RFID tag 100 of the first embodiment. In the second embodiment, like components/parts are denoted with like reference numerals of the RFID tag 100 of the first embodiment and are not further explained.

As illustrated in FIG. 17A, the RFID tag 200 includes the cover part 120 and the cover part 230. Because the inlay 110 (see FIG. 1B) is provided between the cover part 120 and the cover part 230, the inlay 110 is not illustrated in FIG. 17A. The RFID tag 200 of the second embodiment uses the cover part 230 instead of the cover part 130 (see FIG. 1B) of the RFID tag 100 of the first embodiment.

The cover part 230 includes the bottom part 131 and sidewall parts 232, 233, 234, and 235.

The RFID tag 200 is highly resistant to stress exerted in a direction parallel to the X-Y plane or a direction relatively parallel to the X-Y plane because the RFID tag 200 receives the stress in the plane directions of the cover part 120 and the bottom part 131. However, because the cover part 120 and the bottom part 131 are thin in the Z axis direction, countermeasures are to be taken against stress exerted in the Z axis direction.

Accordingly, as a countermeasure against stress exerted in the Z axis direction, the RFID tag 200 includes the sidewall parts 232-235 that are erect from the bottom part 131.

The sidewall parts 232-235 are erected as a frame from the four sides of the bottom part 131. Thereby, the sidewall parts 232-235 constitute a frame. The sidewall parts 232-235 are examples of frame parts. For example, the sidewall parts 232-235 may be integrally formed with the bottom part 131. The sidewall parts 232-235 and the bottom part 131 form a hollow rectangular parallelepiped shape without having an upper surface.

The sidewall part 232 and the sidewall part 234 face each other and have substantially the same dimensions. Further, the sidewall part 233 and the sidewall part 235 face other and have substantially the same dimensions.

Although the sidewall parts 232-235 have the same height (length in the Z axis direction), the lengths of the sidewall parts 232, 234 in their longitudinal directions (length in the Y axis direction) are greater than the lengths of the sidewall parts 233, 235 in their longitudinal directions (length in the X axis direction).

It is to be noted that the lengths of the sidewall parts 232, 234 in their longitudinal directions may be the same as the lengths of the sidewall parts 233, 235 in their longitudinal directions. Alternatively, the lengths of the sidewall parts 233, 235 in their longitudinal directions may be greater than the lengths of the sidewall parts 232, 234 in their longitudinal directions.

Groove parts 232A-235A are formed in the outer surfaces of the sidewall parts 232-235, respectively.

The groove part 232A is formed at a center of the sidewall part 232 in its height direction and extends in the Y axis direction. The groove part 232A is formed extending to a point where the ends of the groove part 232A reach respective ends of the sidewall part 232. The groove part 233A is formed at a center of the sidewall part 233 in its height direction and extends in the X axis direction. The groove part 233A is formed extending to a point where the ends of the groove part 233A reach the respective ends of the sidewall part 233.

The groove part 234A is formed in the outer surface of the sidewall part 234 at substantially the same position as the groove part 232A of the sidewall part 232. The groove part 235A is formed in the outer surface of the sidewall part 235 at substantially the same position as the groove part 233A.

Further, slits 236A, 236B, 236C, and 236D are formed in the cover part 230.

The slit 236A is provided between the sidewall part 232 and the sidewall part 233 and is positioned directly above the corner part 131A of the bottom part 131. The slit 236A is formed by hollowing out a portion corresponding to a joint part between the sidewall part 132 and the sidewall part 133 of the first embodiment in the Z axis direction. The lower end of the cover part 230 and the upper end 237A are left remaining when forming the slit 236A.

That is, an end part of the sidewall part 232 toward the negative side in the Y axis direction is removed (notched) a predetermined length in the Y axis direction, and an end part of the sidewall part 233 toward the negative side in the X axis direction is removed (notched) a predetermined length in the Y axis direction, in a manner that the lower end of the cover part 230 and the upper end 237A are left remaining.

The slit 236B is provided between the sidewall part 233 and the sidewall part 234 and is positioned directly above the corner part 131B of the bottom part 131. The slit 236B is formed by hollowing out a portion corresponding to a joint part between the sidewall part 133 and the sidewall part 134 of the first embodiment in the Z axis direction. The lower end of the cover part 230 and the upper end 237B are left remaining when forming the slit 236B.

That is, an end part of the sidewall part 233 toward the negative side in the X axis direction is removed (notched) a predetermined length in the X axis direction, and an end part of the sidewall part 234 toward the negative side in the Y axis direction is removed (notched) a predetermined length in the Y axis direction, in a manner that the lower end of the cover part 230 and the upper end 237B are left remaining.

The slit 236C is provided between the sidewall part 234 and the sidewall part 235 and is positioned directly above the corner part 131C of the bottom part 131. The slit 236C is formed by hollowing out a portion corresponding to a joint part between the sidewall part 134 and the sidewall part 135 of the first embodiment in the Z axis direction. The lower end of the cover part 230 and the upper end 237C are left remaining when forming the slit 236C.

That is, an end part of the sidewall part 234 toward the positive side in the Y axis direction is removed (notched) a predetermined length in the Y axis direction, and an end part of the sidewall part 235 toward the positive side in the X axis direction is removed (notched) a predetermined length in the X axis direction, in a manner that the lower end of the cover part 230 and the upper end 237C are left remaining.

The slit 236D is provided between the sidewall part 235 and the sidewall part 232 and is positioned directly above the corner part 131D of the bottom part 131. The slit 236D is formed by hollowing out a portion corresponding to a joint part between the sidewall part 135 and the sidewall part 132 of the first embodiment in the Z axis direction. The lower end of the cover part 230 and the upper end 237D are left remaining when forming the slit 236D.

That is, an end part of the sidewall part 235 toward the negative side in the X axis direction is removed (notched) a predetermined length in the X axis direction, and an end part of the sidewall part 232 toward the positive side in the Y axis direction is removed (notched) a predetermined length in the Y axis direction, in a manner that the lower end of the cover part 230 and the upper end 237D are left remaining.

Accordingly, the slits 236A, 236B, 236C, and 236D are provided for enabling the sidewall parts 232-235 to fold (deform) more easily in a case where the cover part 230 receives stress in the X axis direction.

When the RFID tag 200 of the second embodiment receives stress exerted toward the negative side in the X axis direction as indicated with the arrows in FIG. 17A, the cover part 230 is folded as illustrated in FIG. 17B.

Because groove parts 232A-235A are formed in the outer surface of the sidewall parts 232-235, the sidewall parts 232-235 can be easily folded in a manner that the groove parts 232A-235A are arranged on their inner side in a case where stress is exerted thereto toward the negative side in the X axis direction.

Therefore, in a case where stress is exerted on the RFID tag 200 toward the negative side in the X axis direction, the sidewall parts 232A-235A are folded (valley fold), so that the groove parts 232A-235A become recesses (valleys) as illustrated in FIG. 17B. When the sidewall parts 232-235 are folded, ends of one of the sidewall parts 232-235 interfere with respective ends of another one of the sidewall parts 232-235. Thus, FIG. 17B illustrates a state in which both ends of the sidewall parts 233 and 235 overlap on top of the respective ends of the sidewall parts 232 and 234. Alternatively, the cover part 230 may be folded in a manner that respective ends of the sidewall parts 232 and 234 overlap on top of both ends of the sidewall parts 232 and 234.

When the sidewall parts 232-235 are folded, shear stress is exerted to the upper ends 237A, 237B, 237C, and 237D. Further, if the upper ends 237A, 237B, 237C, and 237D are broken during the folding of the sidewall parts 232-235, the sidewall parts 232-235 would not be able to return to their erected state.

Therefore, in order to ensure the strength of the upper ends 237A, 237B, 237C, and 237D and prevent the sidewall parts 232-235 from being broken during the folding of the sidewall parts 232-235, each of the upper ends 237A, 237B, 237C, and 237D may be set to have, for example, a predetermined length, width, and thickness.

Depending on the usage of the RFID tag 200, it may be preferable for the upper ends 237A, 237B, 237C, and 237D to be when the sidewall parts 232-235 are folded from the standpoint of, for example, protecting identification information stored in the IC chip 30. In this case, each of the upper ends 237A, 237B, 237C, and 237D may be set to have, for example, a predetermined length, width, and thickness, so that the upper ends 237A, 237B, 237C, and 237D can be easily broken when the sidewall parts 232-235 are folded.

Next, the height of the groove parts 232A-235A from the bottom part 131 are described with reference to FIGS. 18A and 18B.

FIGS. 18A and 18B are schematic diagrams for describing a relationship of the height of the groove parts 232A-235A from the bottom part 131 and the distance between the inner surface of the sidewall part 232 and the IC chip 30. For the sake of convenience, the sidewall part 232 is described by separately explaining an upper part 232U of the sidewall part 232 (hereinafter also referred to as "upper sidewall part 232U") positioned higher than the groove part 232A and a lower part 232L of the sidewall part 232 (hereinafter also referred to as "lower sidewall part 232L") positioned lower than the groove part 232A.

As illustrated in FIG. 18A, "H2" indicates a height from the surface of the bottom part 131 to the lower end of the groove part 232A (upper end of the lower sidewall part 232L), and "Lm" indicates a distance from the inner surface of the sidewall part 232 to the IC chip 30.

When stress is exerted to the sidewall part 232 toward the negative side in the Z axis direction as illustrated with an arrow in FIG. 18A, the sidewall part 232 is folded in a manner that the groove part 232A is arranged in its inner side to form a valley (recess).

In order to prevent the sidewall part 232 from overlapping with the IC chip 30 when the sidewall part 232 is folded, the height H2 of FIG. 18A is to have a dimension that is less than the distance Lm. In other words, a relationship of:

$$H2 < Lm$$

is to be satisfied.

This relationship is also to be satisfied for each of the other sidewall parts 233-235.

Accordingly, the heights of the sidewall parts 232-235 and the distances between the inner surface of the sidewall parts 232-235 and the IC chip 30 are to be set, so that all of the sidewall parts 232-235 to satisfy the relationship of H2<Lm.

The positions of the groove parts 232A-235A with respect to the heights of the sidewall parts 232-235 may be arbitrarily set. That is, the positions of the groove parts 232A-235A (height from the surface of the bottom part 131) in the height direction of the sidewall parts 232-235 may be arbitrarily set.

For example, the positions of the groove parts 232A-235A (height from the surface of the bottom part 131) may be midpoints of the sidewall parts 232-235 in their height direction. Alternatively, the positions of the groove parts 232A-235A (height from the surface of the bottom part 131) may be offset from the midpoints of the sidewall parts 232-235 in their height direction.

Further, the positions of the groove parts 232A-235A (height from the surface of the bottom part 131) in the height direction of the sidewall parts 232-235 may be set, so that the upper ends 237A, 237B, 237C, and 237D are easily broken when the sidewall parts 232-235 are folded. For example, the positions of the groove parts 232A-235A (height from the surface of the bottom part 131) in the height direction of the sidewall parts 232-235 may be set, so that the stress exerted on the sidewall parts 232-235 is concentrated to the upper ends 237A, 237B, 237C, and 237D. Thereby, the upper ends 237A, 237B, 237C, and 237D can be easily broken and the stress can be efficiently absorbed when the cover part 230 is folded.

The cover part 230 deforms more easily by stress exerted in the negative side in the Z axis direction in a case where the groove parts 232A-235A are formed in the sidewall parts 232-235. However, the sidewall parts 232-235 may be formed without the groove parts 232A-235A as long as the cover part 230 can deform in a similar manner as the case where the groove parts 232A-235A are formed in the sidewall parts 232-235.

Further, the cover part 230 deforms more easily by stress exerted in the negative side in the Z axis direction in a case where the slits 236A, 236B, 236C, and 236D are formed in the cover part 230. However, the cover part 230 may be formed without the slits 236A, 236B, 236C, and 236D as long as the cover part 230 can deform in a similar manner as the case where the slits 236A, 236B, 236C, and 236D are formed in the cover part 230.

Hence, with the RFID tag 200 of the second embodiment, in a state where an end of the cover part 230 toward the positive side in the Z axis direction is contacting the metal object 500 when no stress is exerted on the cover part 230, the inlay 110 can be separated from the metal object 500 at a distance equivalent to the height of the cover part 230. Thereby, the RFID tag 200 can perform communications.

Further, in a case where pressure is exerted from the object 500 to the cover part 230 toward the positive side in the Z axis direction, stress can be absorbed and a space can be formed directly above the IC chip 30 by folding the sidewall parts 232-235 of the cover part 230. Therefore, the IC chip 30 or the connection part between the IC chip 30 and the antenna 20 can be prevented from being damaged.

When pressure is exerted from the metal object 500 to the cover part 130 in a state where the sidewall parts 232-235 of the cover part 230 are folded, the gap between the antenna 20 and the metal object 500 becomes small. Therefore, the communication performance of the antenna 20 is reduced compared to a case where the sidewall parts 232-235 are erect.

However, the sidewall parts 232-235 can return to their erect positions when the sidewall parts 232-235 are released from the state of receiving pressure from the metal object 500 by removing the metal object 500.

Therefore, even in a case in a state where an end of the cover part 230 toward the positive side in the Z axis direction is contacting the metal object 500 after the sidewall parts 232-235 have returned to their erect positions, the inlay 110 can be separated from the metal object 500 at a distance equivalent to the height of the cover part 230. Accordingly, a satisfactory communication state can be ensured for the RFID tag 200.

Figure 19A:
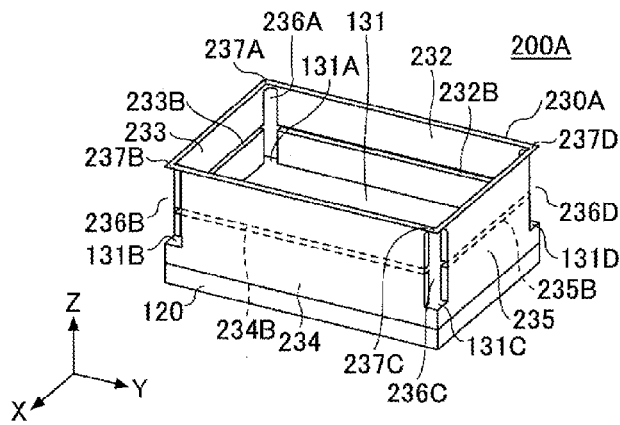
FIGS. 19A-19D are schematic diagrams illustrating an RFID tag according to a first modified example of the second embodiment of the present invention.
Figure 19B:
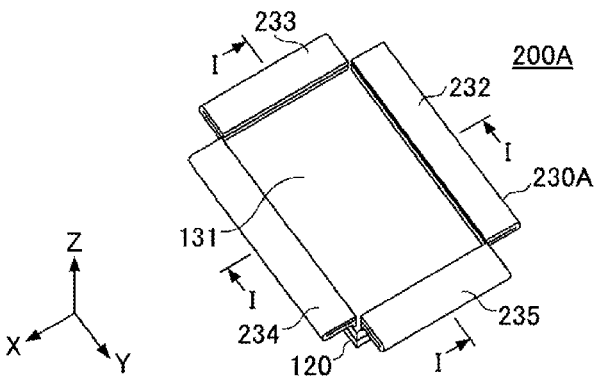
Figure 19C:
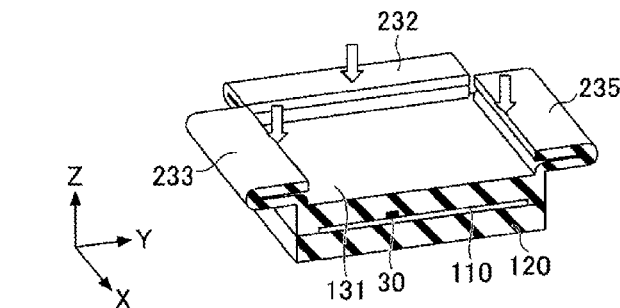
Figure 19D:
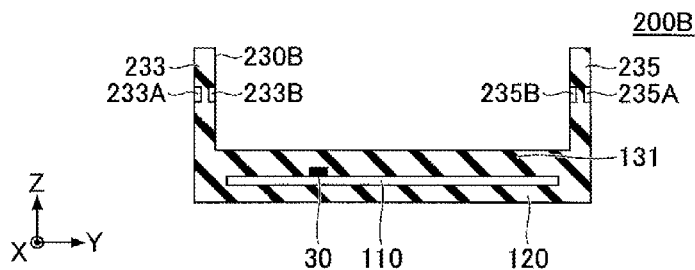

FIGS. 19A-19D are schematic diagrams illustrating an RFID tag 200A according to a first modified example of the second embodiment. FIG. 19A is a perspective view illustrating the RFID tag 200A, and FIG. 19B is a perspective view illustrating a state where stress is exerted to the RFID tag 200A of FIG. 19A. FIG. 19C is a cross-sectional view taken along line I-I of FIG. 19B. FIG. 19D is a cross-sectional view illustrating a second modified example of the RFID tag 200B.

The RFID tag 200A according to the first modified example of the second embodiment includes a cover part 230A instead of the cover part 230 of FIGS. 17A-17B. The cover part 230A includes groove parts 232B-235B formed in the inner surfaces of the sidewall parts 232-235 instead of the groove parts 232A-235A formed in the outer surfaces of the sidewall parts 232-235 of the cover part 230 (see FIG. 17A). In the first modified example of the second embodiment, like components/parts are denoted with like reference numerals of the RFID tag 200 of the second embodiment (see FIG. 17A) and are not further explained.

The groove parts 232B-235B are formed in the inner surfaces of the sidewall parts 232-235, respectively.

The groove part 232B is formed at a center of the sidewall part 232 in its height direction and extends in the Y axis direction. The groove part 232B is formed extending to a point where both ends of the groove part 232B reach both ends of the sidewall part 232. The groove part 233B is formed at a center of the sidewall part 233 in its height direction and extends in the X axis direction. The groove part 233B is formed extending to a point where both ends of the groove part 233B reach both ends of the sidewall part 233.

The groove part 234B is formed in the inner surface of the sidewall part 234 at substantially the same position as the groove part 232B of the sidewall part 232. The groove part 235B is formed in the inner surface of the sidewall part 235 at substantially the same position as the groove part 233B.

When the RFID tag 200A receives stress exerted toward the negative side in the Z axis direction, the cover part 230A is folded as illustrated in FIGS. 19B and 19C.

Because groove parts 232B-235B are formed in the inner surface of the sidewall parts 232-235, the sidewall parts 232-235 can be easily folded in a manner that the groove parts 232B-235B are arranged on their outer side in a case where stress is exerted thereto toward the negative side in the X axis direction.

Therefore, in a case where stress is exerted on the RFID tag 200A toward the negative side in the X axis direction, the sidewall parts 232B-235B are folded (mountain fold), so that the groove parts 232B-235B are formed to be projections (mountains) as illustrated in FIG. 17B. When the sidewall parts 232B-235B are folded, the lower parts of the sidewall parts 232-235 positioned lower than the groove parts 232B-235B are folded to extend more outward than the bottom part 131 from a plan view. Therefore, the sidewall parts 232-235 are positioned more outward than the bottom part 131 from a plan view in a state where the sidewall parts 232-235 are folded. Accordingly, both ends of the sidewall parts 232-235 do not interfere with each other as illustrated in FIG. 19B.

Similar to the cover part 230 of FIGS. 17A and 17B, shear stress is exerted to the upper ends 237A, 237B, 237C, and 237D when the sidewall parts 232-235 are folded. Therefore, in order to ensure the strength of the upper ends 237A, 237B, 237C, and 237D and prevent the sidewall parts 232-235 from being broken during the folding of the sidewall parts 232-235, each of the upper ends 237A, 237B, 237C, and 237D may be set to have, for example, a predetermined length, width, and thickness.

Further, as described above, the sidewall parts 232-235 are positioned more outward than the bottom part 131 from a plan view in a state where the sidewall parts 232-235 are folded. Therefore, the sidewall parts 232-235 are not positioned above the bottom part 131 when the sidewall parts 232-235 are in the folded state. That is, the sidewall parts 232-235 are not positioned above the IC chip 30 when the sidewall parts 232-235 are in the folded state.

Thus, in a case where pressure is exerted to the RFID tag 200A from the object 500 (see FIG. 4A) or the object 500A (see FIG. 7), the sidewall parts 232-235 may be set with a predetermined size, strength, or the like, so that the object 500 or 500A contacts the sidewall parts 232-235 but does not contact the bottom part 131. Thereby, the IC chip 30 or the connection part between the IC chip 30 and the antenna 20 can be prevented from being damaged. Thus, as illustrated in FIG. 19C, the sidewall parts 232-235 are not positioned an area above the IC chip 30 even in a case where the sidewall parts 232-235 are folded.

In the embodiment illustrated in FIGS. 17A-17B, the groove parts 232A-235A are formed in the outer surfaces of the sidewall parts 232-235. In the embodiment illustrated in FIGS. 19A-19C, the groove parts 232B-235B are formed in the inner surfaces of the sidewall parts 232-235. Alternatively, the groove parts may be formed on both the inner and outer surfaces of the sidewall parts 232-235 as illustrated in FIG. 19D.

FIG. 19D illustrates a cross section of an RFID tag 200B according to a second modified example of the second embodiment in which the cross section is parallel to the Y-Z plane of the RFID tag 200B. As illustrated in FIG. 19D, groove parts 233A, 233B, 235A, 235B are formed in corresponding sidewall parts 233, 235 of the cover part 230B of the RFID tag 200B. The sizes of the groove parts 233A and 233B may the same as the sizes of the groove parts 235A and 235B. The positions of the groove parts 233A and 233B relative to the height direction may be the same as the positions of the groove parts 233A and 235B relative to the height direction.

In a case where stress is exerted to the cover part 230B toward the negative side in the Z axis direction, whether the sidewall parts 232-235 fold toward the inside of the cover part 230B or toward the outside of the cover part 230B depends on, for example, the sizes and positions of the groove parts 232A-235A and the groove parts 232B-235B. Thus, the sidewall parts 232-235 are set to have sizes that prevent the sidewall parts 232-235 from being positioned directly above the IC chip 30 when the sidewall parts 232-235 are folded toward the inside of the cover part 230B.

By setting the groove parts 233A and 233B and the groove parts 235A and 235B to have different positions relative to the height direction, the sidewall parts 232-235 can be set to fold toward the inside of the cover part 230B or the outside of the cover part 230B.

In addition to setting the positions of the groove parts 233A and 233B and the groove parts 235A and 235B, the widths relative to the height direction and the depths of the groove parts 233A, 233B, 235A and 235B may also be adjusted.

Figure 20A:
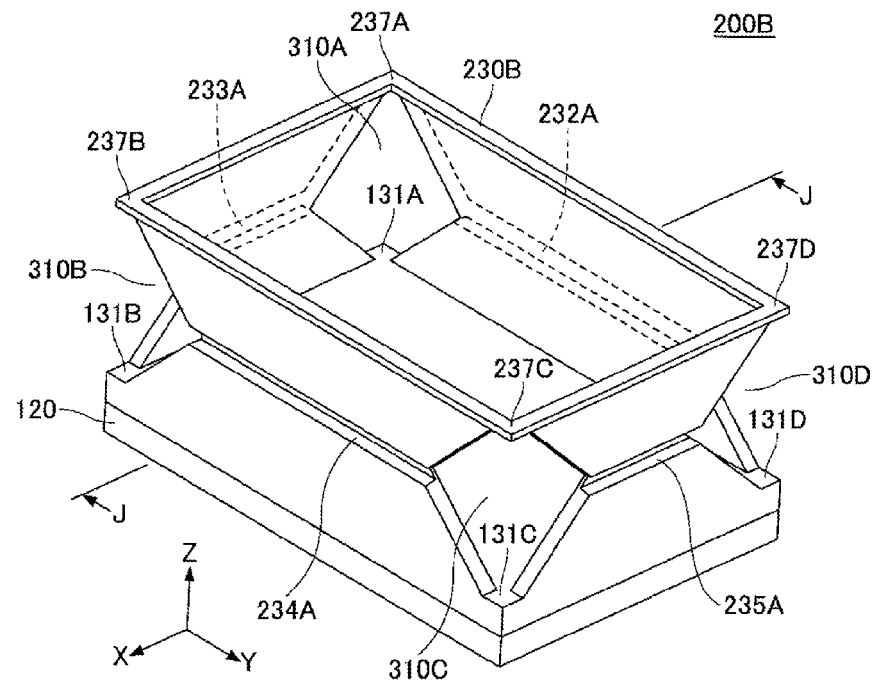
FIGS. 20A-20B are schematic diagrams illustrating an RFID tag according to a second modified example of the second embodiment of the present invention.
Figure 20B:
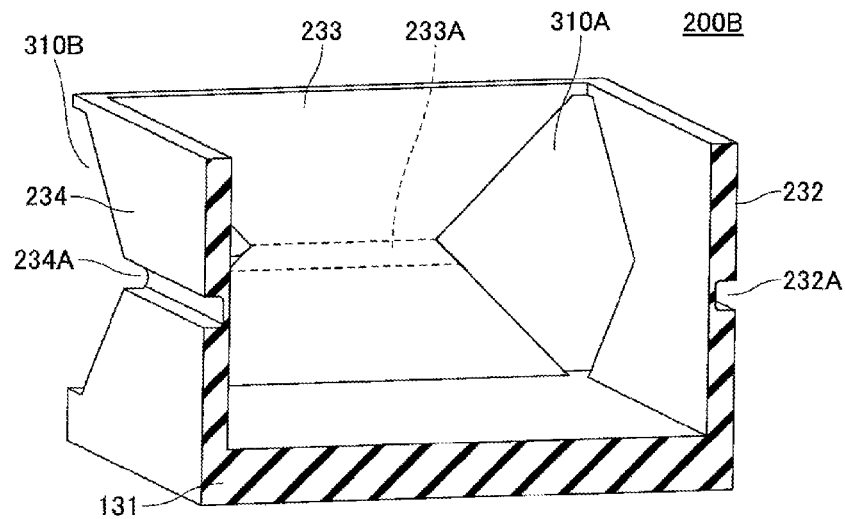

FIGS. 20A-21B are schematic diagrams illustrating an RFID tag 200B according to a second modified example of the second embodiment. FIG. 20A is a perspective view illustrating the RFID tag 200B, and FIG. 20B is a cross-sectional view taken along line J-J of FIG. 20B.

Figure 21A:
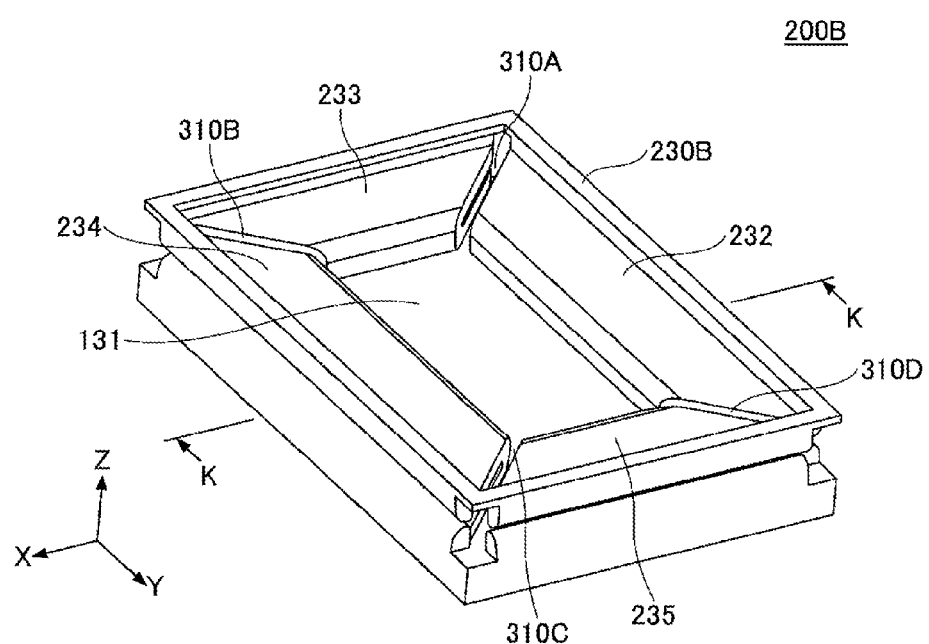
FIGS. 21A-21B are schematic diagrams illustrating an RFID tag according to a second modified example of the second embodiment of the present invention.
Figure 21B:
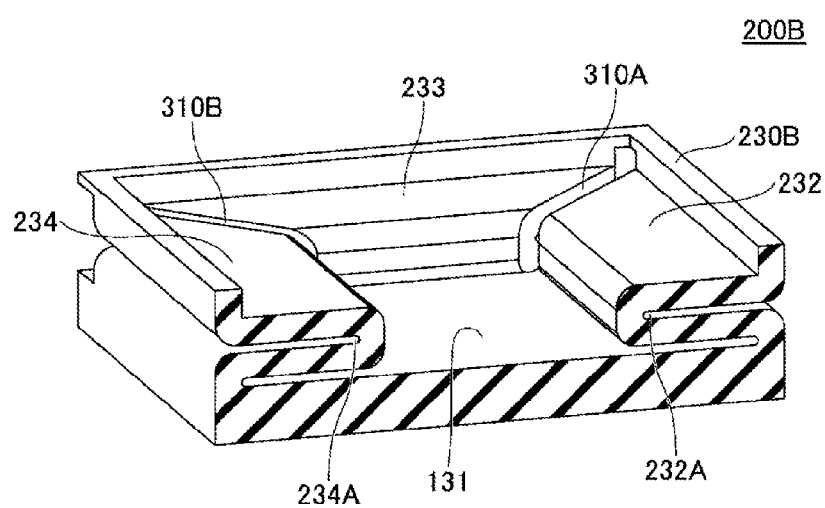

FIG. 21A is a schematic diagram illustrating a state where stress is exerted to the RFID tag 200B. FIG. 21B is a cross-sectional view taken along line K-K of FIG. 21A.

The RFID tag 200B according to the second modified example of the second embodiment includes a cover part 230B that has a configuration different from the configuration of the cover part 230 of the second embodiment (see FIG. 17A). In the second modified example of the second embodiment, like components/parts are denoted with like reference numerals of the RFID tag 200 of the second embodiment (see FIG. 17A) and are not further explained.

As illustrated in FIG. 20A, the RFID tag 200B includes the cover part 120B and the cover part 230B. The cover part 230B includes the bottom part 131 and the sidewall parts 232-235. The cover part 230B is formed with slits 310A-310D instead of the slits 236A-236D illustrated in FIG. 17A. Other than the slits 310A-310H, the configuration of the cover part 230B is substantially the same as the cover part 230 illustrated in FIG. 17A.

As illustrated in FIGS. 21A and 21B, the slits 310A-310D are open, so that the sidewall parts 232-235 do not interfere with each other when the cover part 230B is folded.

The slit 310A is formed by notching a part of an Y-Z plane of the cover part 230B from the upper end 237A to a groove part 232A in a direction that forms a 45 degree angle relative to the Z axis. Similarly, a lower part of the slit 310A (a part of the slit 310A lower than the groove part 232A) is also formed by notching a Y-Z plane of the cover part 232A from the corner part 131A of the bottom part 131 to the groove part 232A in a direction that forms a 45 degree angle relative to the Z axis.

Similarly, the slit 310A is formed by notching a part of an X-Z plane of the cover part 230B from an upper end 237A to a groove part 232A in a direction that forms a 45 degree angle relative to the Z axis. Similarly, a lower part of the slit 310A (a part of the slit 310A lower than the groove part 232A) is also formed by notching a X-Z plane of the cover part 232A from the corner part 131A of the bottom part 131 to the groove part 232A in a direction that forms a 45 degree angle relative to the Z axis.

The slits 310B-310D have the same configurations as the above-described configuration of the slit 310A.

Therefore, as illustrated in FIGS. 21A, 21B, the sidewall parts 232-235 do not interfere with each other when the cover part 230B is folded.

Further, even if the sidewall parts 232-235 are folded, stress can be prevented from being exerted to the IC chip 30 because the sidewall parts 232-235 are not positioned at a center area of the bottom part 131 from a plan view as illustrated in FIG. 21B.

Next, a process of fabricating slits 310A-310D that prevent the sidewall parts 232-235 from interfering with each other in a folded state is described with reference to FIGS. 22A-22C.

FIGS. 22A-22C illustrate parts to be notched for fabricating the slits 310A-310D that prevent the sidewall parts 232-235 from interfering with each other in the folded state. In the embodiment illustrated in FIGS. 22A-22C, the notch parts 320, 330, and 340 are to be formed in the sidewall part 232. The configuration of the sidewall part 232 is substantially the same as the configuration of the sidewall part 232 illustrated in FIG. 20A.

As illustrated in FIG. 22A, the groove part 232A is formed in the inner surface of the sidewall part 232 along the Y axis. The sidewall part 232 includes the upper sidewall part 232U positioned higher than the groove part 232A and the lower sidewall part 232L positioned lower than the groove part 232A. Further, as illustrated in FIG. 22A, the height of the upper sidewall part 232U is assumed to be "H11", the height of the lower sidewall part 232L is assumed to be "H12", and the heights of the upper and lower sidewall parts 232U, 232L are assumed to satisfy a relationship of H11<H12. As illustrated in FIG. 22A, the height of the sidewall part 232L is evenly included in the heights of the upper and lower sidewall parts 232U, 232L.

In the embodiment illustrated in FIGS. 22A-22C, "Q" is assumed to be a point at which the groove part 232A intersects a straight line extending from a corner R on a lower end side of the sidewall part 232 and forming a negative angle of 45 degrees relative to the Z axis; "P" is assumed to be a point at which the upper end of the sidewall part 232 intersects a straight line extending from the point Q and forming a positive angle of 45 degrees; and "S" is assumed to be a point at which a straight line perpendicular to the upper end of the sidewall part 232 intersects the upper end of the sidewall part 232.

By removing a portion corresponding to a quadrangle PQRS from the sidewall part 232, the notch part 320 can be fabricated. The same also applies to fabricating the notch part 320 in the sidewall part 232 on the negative side in the Y axis direction.

Similarly, the notch parts 320 may be formed in the sidewall parts 233-235 illustrated in FIG. 20A. In a case where the height H12 of each of the lower sidewall parts 232L-235L and the height H11 of each of the upper sidewall parts 232U-235U are equal, the slits 310A-310D of FIG. 20A can be formed by notching the notch part 320.

In a case where the height H12 of each of the lower sidewall parts 232L-235L and the height H11 of each of the upper sidewall parts 232U-235U are equal, the lower sidewall part 232L and the upper sidewall part 232U move evenly when the cover part 230B is folded in a manner illustrated in FIGS. 21A and 21B. The same also applies to the upper sidewall parts 233U-235U and the lower sidewall parts 233L-235L.

In this case, the shear stress exerted to the upper ends 237A, 237B, 237C, and 237D becomes minimal.

On the other hand, in a case where the height H12 of each of the lower sidewall parts 232L-235L and the height H11 of each of the upper sidewall parts 232U-235U are not equal, the amount in which the lower sidewall part 232L and the amount in which upper sidewall part 232U move are not even when the cover part 230B is folded in a manner illustrated in FIGS. 21A and 21B. The same also applies to the upper sidewall parts 233U-235U and the lower sidewall parts 233L-235L.

Therefore, in a case where the height H12 of each of the lower sidewall parts 232L-235L and the height H11 of each of the upper sidewall parts 232U-235U are not equal, the shear stress exerted to the upper ends 237A, 237B, 237C, and 237D becomes large.

Therefore, the relationship between the height H12 of each of the lower sidewall parts 232L-235L and the height H11 of each of the upper sidewall parts 232U-235U is to be determined by considering the shear stress exerted to the upper ends 237A, 237B, 237C, and 237D.

In a case where the relationship between the height H12 of the lower sidewall part 232L and the height H11 of the upper sidewall part 232U is H11<H12 as illustrated in FIG. 22B, the notch part 330 may be formed by notching an end part of the sidewall part 232 having a length in the Y axis direction that is equivalent to the height H12. The same also applies to the sidewall parts 233-235.

In this case, the sidewall parts 232-235 do not overlap each other even when the sidewall parts 232-235 are folded owing to the notch part 330 formed in each of the sidewall parts 232-235.

In a case where the relationship between the height H12 of the lower sidewall part 232L and the height H11 of the upper sidewall part 232U is H12<H11 as illustrated in FIG. 22C, the notch part 340 may be formed by notching an end part of the sidewall part 232 having a length equivalent to the height H12 and a height (height from lower end of the sidewall part 232) equivalent to the height H12×2. The same also applies to the sidewall parts 233-235.

In this case of H12<H11, the sidewall parts 232-235 do not overlap each other even when the sidewall parts 232-235 are folded by stress owing to the notch part 340 being formed in each of the sidewall parts 232-235 with a length equivalent to the height H12 and a height (height from lower end of the sidewall part 232) equivalent to the height H12×2.

In contrast to the case of FIG. 22C, in a case where the relationship between the height H12 of the lower sidewall part 232L and the height H11 of the upper sidewall part 232U is H11<H12, the notch part 340 may be formed by notching an end part of the sidewall part 232 having a length equivalent to the height H11 and a height (height from upper end of the sidewall part 232) equivalent to the height H11×2. The same also applies to the sidewall parts 233-235.

Next, modified examples of the first and second embodiment are described with reference to FIGS. 23-26B.

Figure 23:
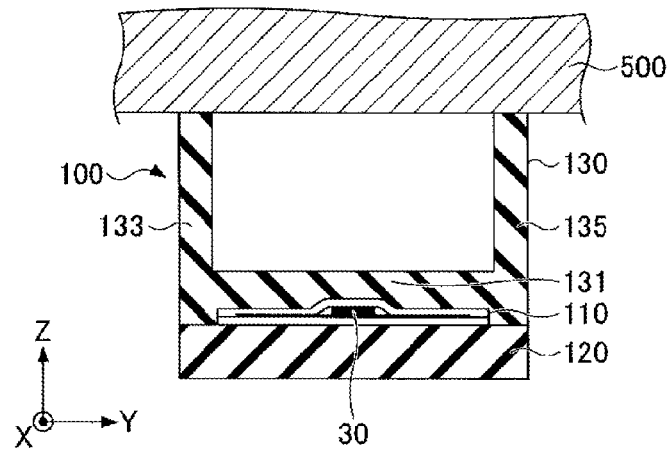
FIG. 23 is a schematic diagram illustrating a state where an RFID tag of the first embodiment is adhered to an object.

FIG. 23 is a schematic diagram illustrating a state where the RFID tag 100 of the first embodiment is adhered to the object 500. The RFID tag 100 illustrated in FIG. 23 is substantially the same as the RFID tag 100 of FIG. 3A. The upper end of the cover part 130 (end part toward the positive side in the Z axis direction) is adhered to the object 500. In this example, the object is formed of metal.

By adhering the upper end of the cover part 130 of the RFID tag 100 to the object 500 in a state where no stress is exerted to the RFID tag 100, the inlay 110 can be separated from the metal object 500 at a distance equivalent to the height (length in the Z axis direction) of the cover part 130.

Thus, the RFID tag 100 can perform communications in a state where no stress is exerted to the RFID tag 100 if the height (length in the Z axis direction) of the cover part 130 is a height that is sufficient for performing communications with the antenna 20 of the inlay 110 (e.g., 15 mm).

Figure 24:
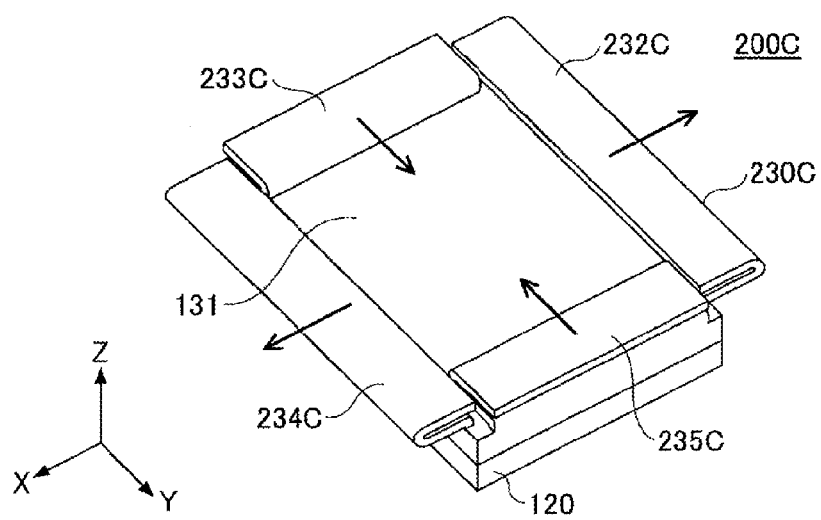
FIG. 24 is a perspective view illustrating a folded state of a cover part of an RFID tag according to an embodiment of the present invention.

FIG. 24 is a perspective view illustrating a folded state of the cover part 230C of an RFID tag 200C. The cover part 230C has a configuration in which the cover part 230 of the RFID tag 200 of the second embodiment (see FIG. 17A) is deformed. In the cover part 230C illustrated in FIG. 24, the groove parts 232A, 234A provided on the outer side of the sidewall parts 232, 234 are moved to the inner side of the sidewall parts 232, 234.

As illustrated with arrows in FIG. 24, the sidewall parts 232C, 234C are folded toward the outside of the cover part 230C whereas the sidewall parts 233C, 235C are folded toward the inside of the cover part 230C.

Figure 25:
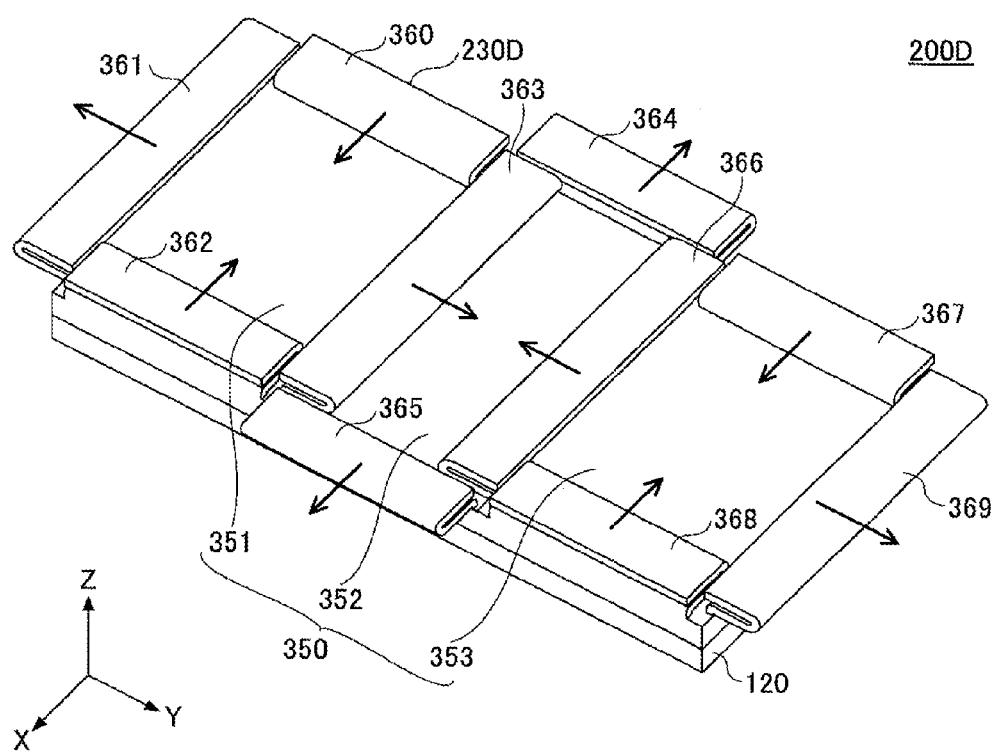
FIG. 25 is a perspective view illustrating a folded state of a cover part of an RFID tag according to another embodiment of the present invention.

FIG. 25 is a perspective view illustrating a folded state of the cover part 230D of an RFID tag 200D.

The cover part 230D includes the bottom part 350 and sidewall parts 360-369. The sidewall parts 360-369 are arranged to form 3 quadrangular shapes. The bottom part 350 is divided into a first-third bottom parts 351-353.

More specifically, the sidewall parts 360, 361, 362, and 363 are arranged in a counter-clockwise direction in this order around the bottom part 351 from a plan view. Further, the sidewall parts 364, 363, 365, and 366 are arranged in a counter-clockwise direction in this order around the bottom part 352 from a plan view. Further, the sidewall parts 367, 366, 368, and 369 are arranged in a counter-clockwise direction in this order around the bottom part 353 from a plan view.

As indicated with the arrows in FIG. 25, the sidewall parts 360, 362, 367, and 368 are folded inward relative to the bottom parts 351, 353, respectively. The sidewall parts 365 and 366 are folded inward relative to the bottom part 352 whereas the sidewall parts 351, 353 are folded outward relative to the bottom parts 351, 353. As indicated with the arrows in FIG. 25, the sidewall parts 361 and 369 are folded outward relative to the bottom parts 351, 353. As indicated with arrows in FIG. 25, the sidewall parts 364 and 365 are folded outward relative to the bottom part 352.

Accordingly, the RDID tag 200D may include both sidewall parts that are folded inward and sidewall parts that are folded outward.

Figure 26A:
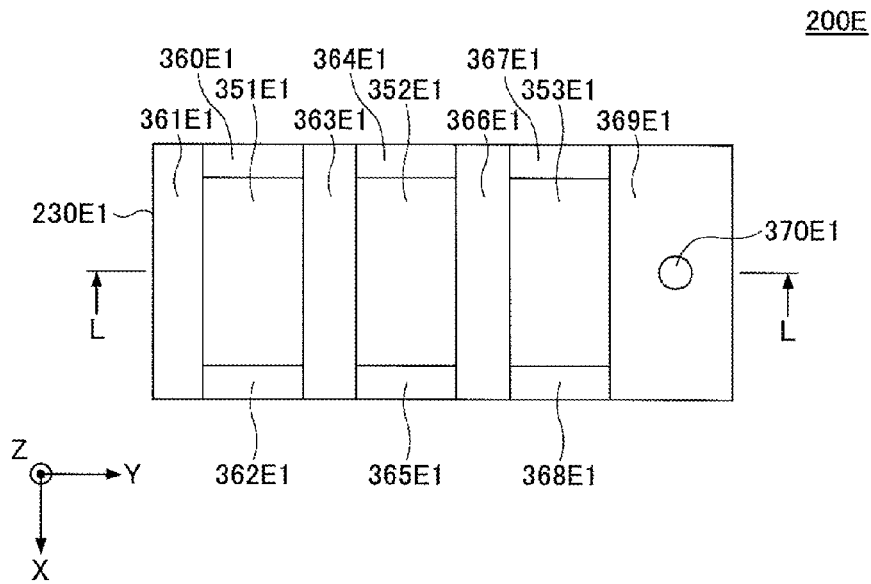
FIGS. 26A-26B are schematic diagrams illustrating an RFID tag according to yet another embodiment of the present invention.
Figure 26B:
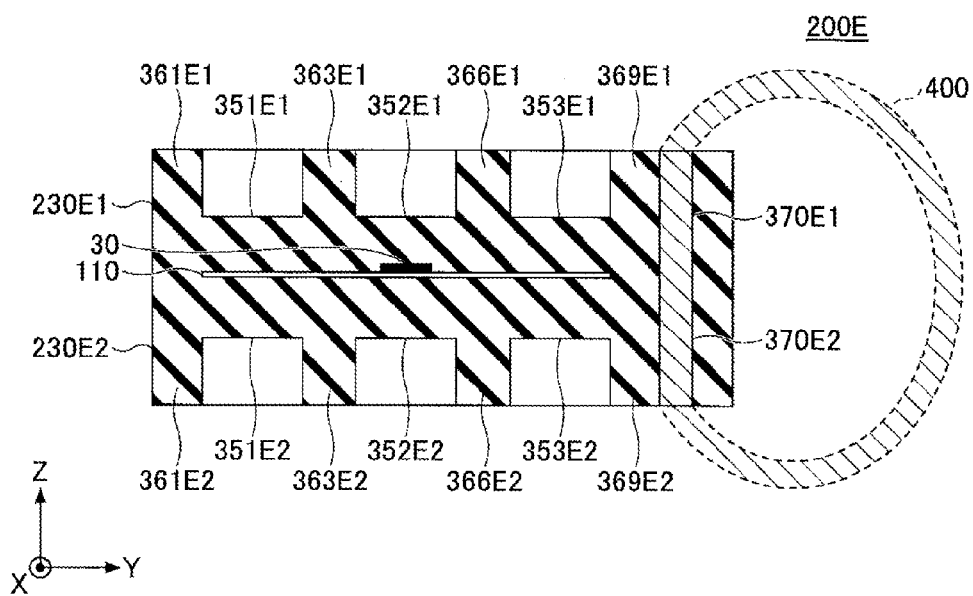

FIGS. 26A-26B are schematic diagrams illustrating an RFID tag 200E. FIG. 26A is a plan view of the RFID tag 200E, and FIG. 26B is a cross-sectional view of the RFID tag 200E taken along line L-L of FIG. 26A. The RFID tag 200E includes the inlay 110 and cover parts 230E1 and 230E2. The cover part 230E1 and the cover part 230E2 have the same configuration.

The cover part 230E1 includes sidewall parts 360E1-369E1. The sidewall parts 360E1-369E1 are arranged in the similar manner as the sidewall parts 360-369 illustrated in FIG. 25 and surround bottom parts 351E1, 352E1, 353E1. Further, the sidewall part 369E1 includes a through-hole 370E1 penetrating the sidewall part 369E1 in the Z axis direction.

Similarly, the cover part 230E2 also includes 9 sidewall parts 361E2-369E2. However, among the 9 sidewall parts 361E2-369E2, only the sidewall parts 361E2, 363E2, 366E2, and 369E2 are illustrated in FIG. 26B. The 9 sidewall parts 361E2-369E2 surround bottom parts 351E1, 352E1, and 353E1.

Further, the sidewall part 369E2 includes a through-hole 370E2. As illustrated in FIG. 26B, the through-holes 370E1, 370E2 are formed in communication by adhering the cover part 230E1 and the cover part 230E2 together. A strap 400 (illustrated with broken lines in FIG. 26B) may be inserted through the through-holes 370E1, 370E2.

Thus, the RFID tag 200E may be attached to the object 500 by using the strap 400.

Hence, by using the RFID tag 200E, the inlay 110 can be separated from the metal object 500 at a distance equivalent to the height of the cover part 230 in a state where no stress is exerted on the cover parts 230E1 and 230E2. Thereby, the RFID tag 200E can perform communications.

Further, in a case where pressure is exerted from the object 500 to the cover parts 230E1, 230E2, stress can be absorbed and a space can be formed directly above the IC chip 30 by folding the cover part 230E1 and/or the cover part 230E2. Therefore, the IC chip 30 or the connection part between the IC chip 30 and the antenna 20 can be prevented from being damaged.

When pressure is exerted from the metal object 500 to the cover parts 230E1, 230E2 in a state where the cover part 230E1 and/or the cover part 230E2 are folded, the gap between the antenna 20 and the metal object 500 becomes small. Therefore, the communication performance of the antenna 20 is reduced compared to a case where the sidewall parts 232-235 are erect.

However, the cover parts 230E1, 230E2 return to their erect positions when the cover parts 230E1, 230E2 are released from the state of receiving pressure from the metal object 500 by removing the metal object 500.

Therefore, even in a case where the cover parts 230E1, 230E2 are contacting the metal object 500 after the cover parts 230E1, 230E2 have returned to their erect positions, the inlay 110 can be separated from the metal object 500 at a distance equivalent to the height of the cover parts 230E1, 230E2. Accordingly, a satisfactory communication state can be ensured for the RFID tag 200E.

Hence, with the above-described embodiments of the present invention, there can be provided an RFID tag having high resistance against stress and load.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An RFID tag comprising:
   an inlay having a sheet shape and including an antenna and an IC chip electrically connected to the antenna;
   an outer covering member that covers the inlay, the outer covering member having a planar shape and including a main surface and a rear surface; and
   a frame part arranged on at least one of the main surface and the rear surface,
   wherein the frame part includes a sidewall that is erected in a thickness direction of the outer covering member and that is foldable in a direction orthogonal to the thickness direction,
   wherein at least one of a slit or a groove is formed in the sidewall of the frame part,
   wherein the sidewall is configured to fold along the at least one of a slit or a groove,
   wherein the frame part surrounds the IC chip in a plan view.

2. The RFID tag as claimed in claim 1, wherein the groove is formed in the frame part to form an angle relative to the thickness direction of the outer covering member.

3. The RFID tag as claimed in claim 1, wherein the groove has a width that is twice or more of a depth of the groove.

4. The RFID tag as claimed in claim 1, where the groove is formed in an inner or outer surface of the frame part in the plan view.

5. The RFID tag as claimed in claim 1, wherein the groove is formed along the main surface or rear surface of the outer covering member.

6. The RFID tag as claimed in claim 5, wherein the groove is formed in a lower position or a middle position of the frame part relative to a height direction of the frame part.

7. The RFID tag as claimed in claim 6, wherein the groove is formed in a center of the middle position of the frame part relative to the height direction of the frame part.

8. The RFID tag as claimed in claim 1,
   wherein the frame part has a rectangular shape including four corners from the plan view,
   wherein the slit is formed at each of the four corners of the frame part,
   wherein the slit is formed along a direction in which the frame part is erected.

9. The RFID tag as claimed in claim 1,
wherein the frame part has a rectangular shape including four corners in the plan view,
wherein the slit is formed at each of the four corners of the frame part,
wherein the slit is formed along a direction in which the frame part is erected, so that the frame part is prevented from overlapping at the four corners in a case where the frame part is folded.

10. The RFID tag as claimed in claim 1,
wherein the groove is formed in a middle position of the frame part relative to a height direction of the frame part,
wherein the frame part includes a long frame part having a length HL and a short frame part having a length HS,
wherein the length HL of the long frame part is greater than the length HS of the short frame part,
wherein the frame part includes four corners from the plan view,
wherein the slit is formed at each of the four corners of the frame part,
wherein the slit is formed by notching a part of the frame part extending from an upper end of the frame part to a lower end of the frame part,
wherein in a case where the short frame part is positioned higher than the groove, the part of the frame part that is notched has a length equivalent to the length HS and a height equivalent to the length HS×2 relative to the upper end of the frame part;
wherein in a case where the short frame part is positioned lower than the groove, the part of the frame part that is notched has a length equivalent to the length HS and a height equivalent to the length HS×2 relative to the lower end of the frame part.

11. The RFID tag as claimed in claim 1, wherein a length of the frame part relative to the thickness direction of the outer covering member is less than a distance between an inner wall of the frame part to the IC chip in the plan view.

12. The RFID tag as claimed in claim 1,
wherein the frame part has a rectangular shape from the plan view,
wherein the frame part includes four side parts and arcuate parts that connect the four side parts,
wherein the arcuate parts have thicknesses less than the thicknesses of the four side parts.

13. The RFID tag as claimed in claim 1,
wherein the frame part includes a pair of straight line parts facing each other from the plan view and arcuate parts that connect respective ends of the pair of straight line parts to form an arcuate shape,
wherein the arcuate parts have thicknesses less than the thicknesses of the pair of straight line parts.

14. The RFID tag as claimed in claim 1,
wherein the frame part includes a circular shape or an elliptical shape in the plan view.

15. The RFID tag as claimed in claim 1,
wherein the frame part is arranged on both the main and the rear surfaces of the outer covering member.

16. The RFID tag as claimed in claim 1,
wherein the inlay further includes a first sheet part having a front surface, and a second sheet part,
wherein the antenna is formed on the front surface of the first sheet part,
wherein the first and second sheet parts cover the antenna and the IC chip therebetween.

17. An RFID tag comprising:
an antenna;
an IC chip electrically connected to the antenna;
an outer covering member that covers the antenna and the IC chip, the outer covering member having a planar shape and including a main surface and a rear surface; and
a frame part arranged on the main surface or the rear surface,
wherein the frame part includes a sidewall that is erected in a thickness direction of the outer covering member and that is foldable in a direction orthogonal to the thickness direction,
wherein at least one of a slit or a groove is formed in the sidewall of the frame part,
wherein the sidewall is configured to fold along the at least one of a slit or a groove,
wherein the frame part surrounds the IC chip in a plan view.

* * * * *